(12) United States Patent
Pulsipher et al.

(10) Patent No.: US 7,027,411 B1
(45) Date of Patent: Apr. 11, 2006

(54) METHOD AND SYSTEM FOR IDENTIFYING AND PROCESSING CHANGES TO A NETWORK TOPOLOGY

(75) Inventors: Eric A Pulsipher, Ft Collins, CO (US); Joseph R Hunt, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 09/703,942

(22) Filed: Oct. 31, 2000

(51) Int. Cl.
*H04L 12/28* (2006.01)

(52) U.S. Cl. .................. 370/254; 370/403; 370/402; 370/351; 714/717; 709/223; 709/224

(58) Field of Classification Search ............... 370/229, 370/216, 217, 221, 225, 254, 255, 256, 257, 370/258, 410, 403, 402, 350, 400, 252, 351; 709/224, 223, 238; 714/717, 4; 340/825.52; 715/735
See application file for complete search history.

(56) References Cited

U.S. PATENT DOCUMENTS

| | | | |
|---|---|---|---|
| 4,644,532 A * | 2/1987 | George et al. | 370/255 |
| 5,023,873 A * | 6/1991 | Stevenson et al. | 714/4 |
| 5,727,157 A * | 3/1998 | Orr et al. | 709/224 |
| 5,729,685 A * | 3/1998 | Chatwani et al. | 709/224 |
| 5,732,086 A * | 3/1998 | Liang et al. | 370/410 |
| 5,740,346 A * | 4/1998 | Wicki et al. | 714/22 |
| 5,886,643 A | 3/1999 | Diebboll et al. | |
| 6,108,702 A * | 8/2000 | Wood | 709/224 |
| 6,160,796 A * | 12/2000 | Zou | 370/257 |
| 6,295,541 B1* | 9/2001 | Bodnar et al. | 707/203 |
| 6,347,336 B1* | 2/2002 | Song et al. | 709/223 |
| 6,405,248 B1* | 6/2002 | Wood | 709/223 |
| 6,636,981 B1* | 10/2003 | Barnett et al. | 714/4 |
| 6,791,948 B1* | 9/2004 | Desnoyers et al. | 370/254 |
| 6,885,644 B1* | 4/2005 | Knop et al. | 370/254 |

FOREIGN PATENT DOCUMENTS

| | | |
|---|---|---|
| EP | 830047 A2 | 3/1998 |
| JP | 2000-76209 | 3/2000 |
| WO | WO98/44400 | 10/1998 |

* cited by examiner

*Primary Examiner*—Wellington Chin
*Assistant Examiner*—Chuong Ho

(57) ABSTRACT

A method and system are disclosed for mapping the topology of a network having interconnected nodes by identifying changes in the network and updating a stored network topology based on the changes. The nodal connections are represented by data tuples that store information such as a host identifier, a connector interface, and a port specification for each connection. A topology database stores an existing topology of a network. A topology converter accesses the topology database and converts the existing topology into a list of current tuples. A connection calculator calculates tuples to represent connections in the new topology. The topology converter receives the new tuples, identifies changes to the topology, and updates the topology database using the new tuples. The topology converter identifies duplicate tuples that appear in both the new tuples and the existing tuples and marks the duplicate tuples to reflect that no change has occurred to these connections. The topology converter attempts to resolve swapped port conditions and searches for new singly-heard and multi-heard host link tuples in the list of existing tuples. The topology converter also searches for new conflict link tuples in the existing tuples. The topology converter updates the topology database with the new topology.

18 Claims, 26 Drawing Sheets

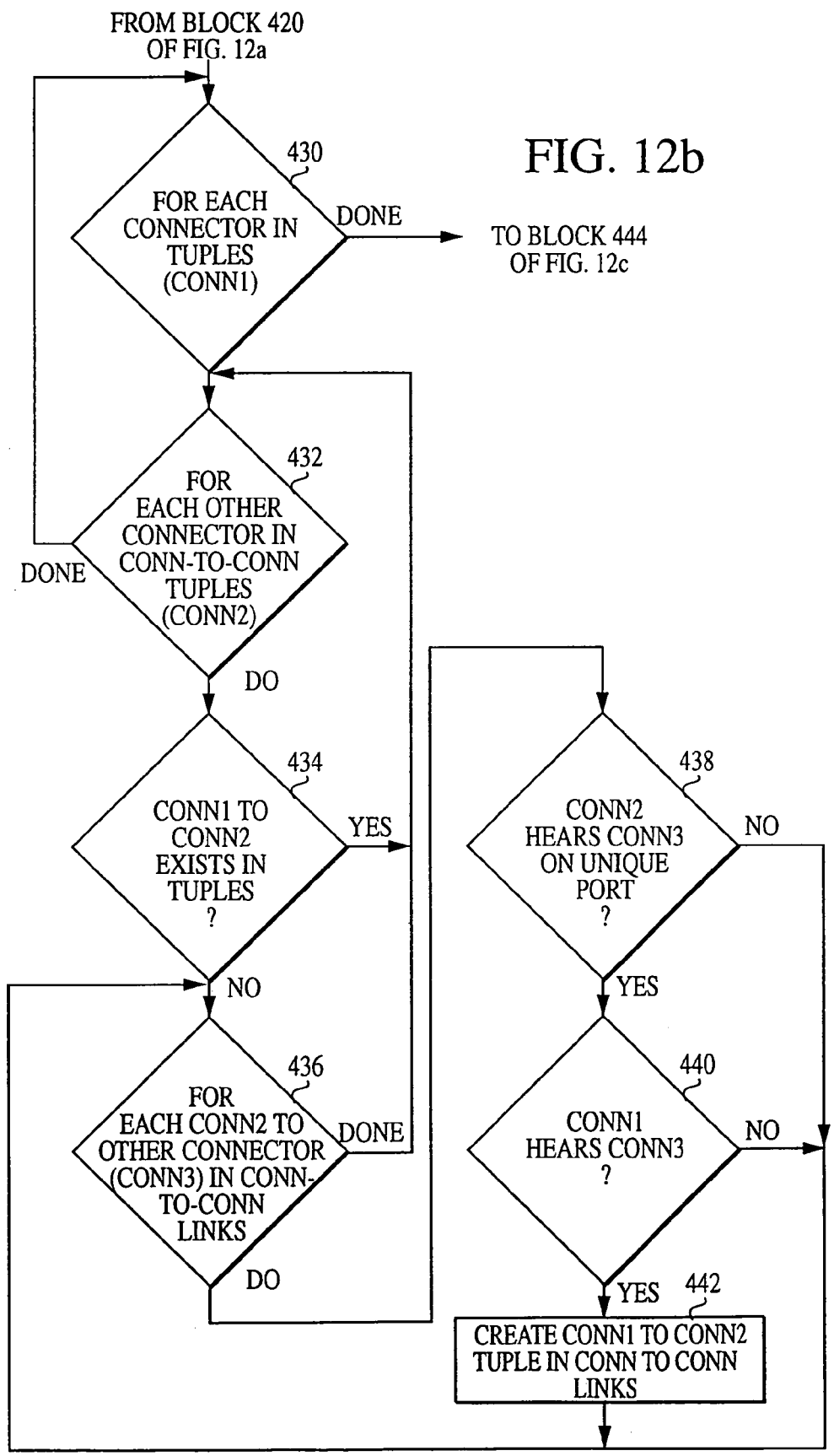

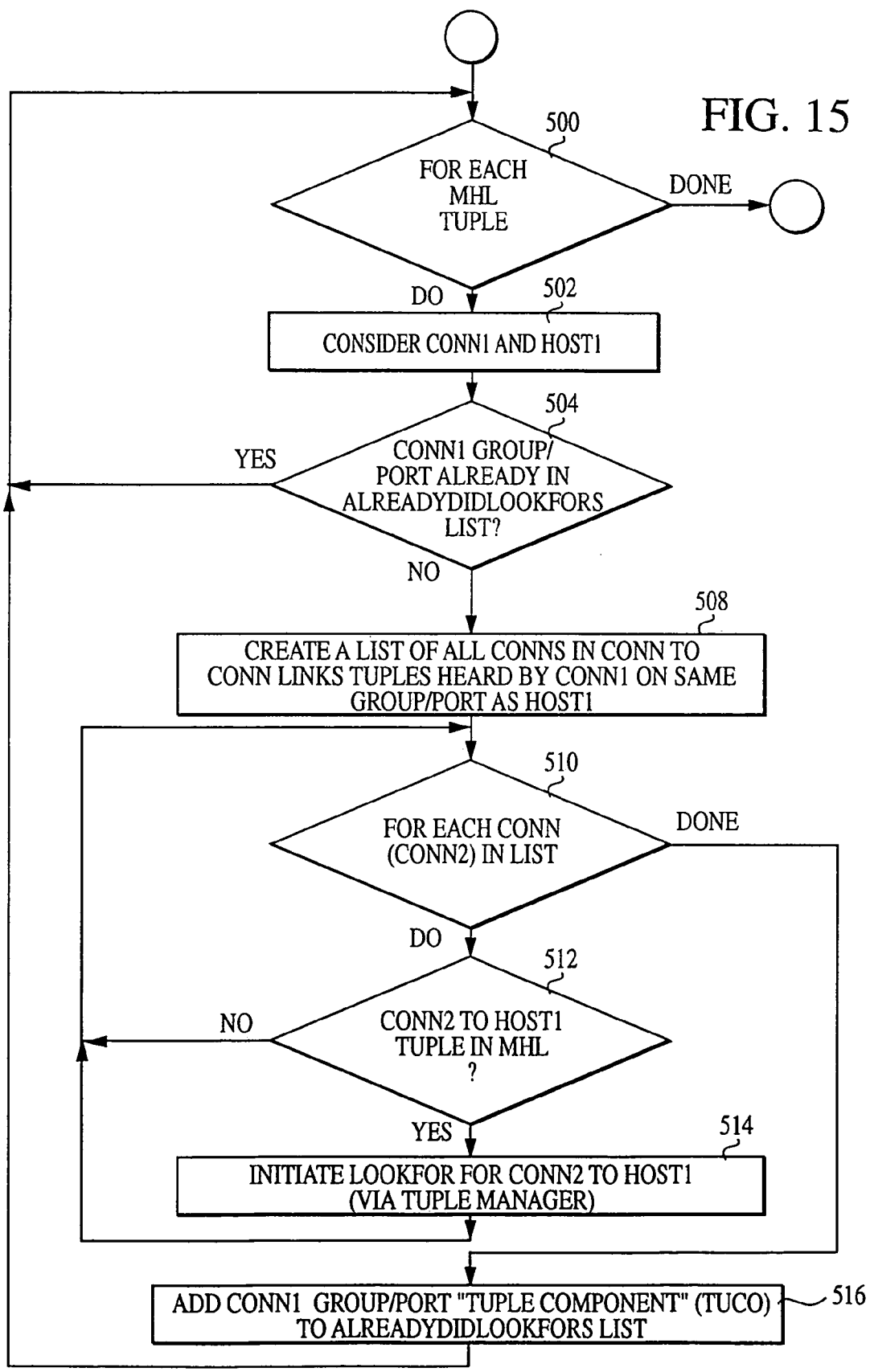

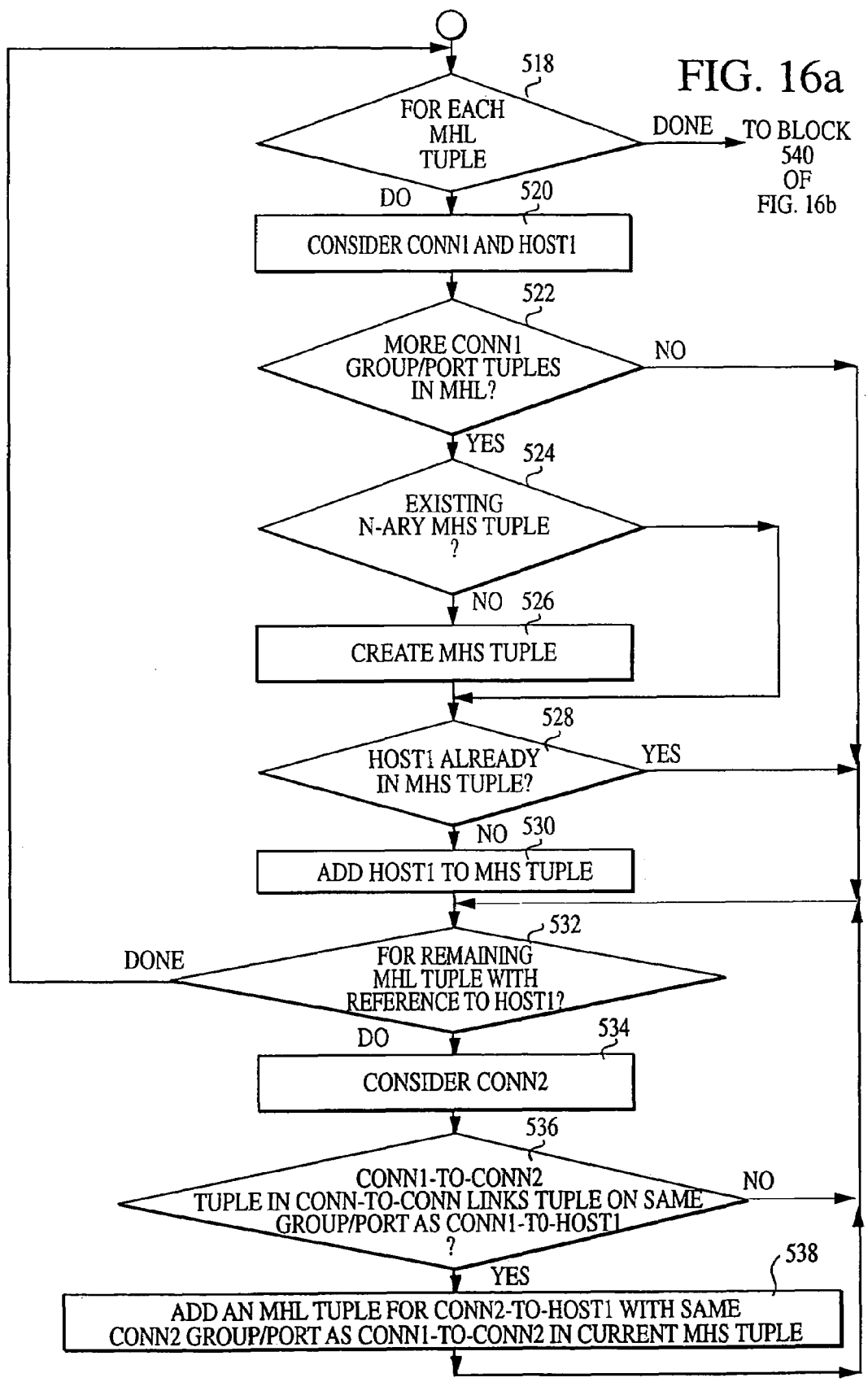

METHOD AND SYSTEM FOR IDENTIFYING AND PROCESSING CHANGES TO A NETWORK TOPOLOGY

FIELD OF INVENTION

The present invention relates generally to computer networks. More particularly, it relates to a method and system for identifying changes to a network topology and for acting upon the network based on the changes.

BACKGROUND

As communications networks, such as the Internet, carry more and more traffic, efficient use of the bandwidth available in the network becomes more and more important. Switching technology was developed in order to reduce congestion and associated competition for the available bandwidth. Switching technology works by restricting traffic. Instead of broadcasting a given data packet to all parts of the network, switches are used to control data flow such that the data packet is sent only along those network segments necessary to deliver it to the target node. The smaller volume of traffic on any given segment results in few packet collisions on that segment and, thus, the smoother and faster delivery of data. A choice between alternative paths is usually possible and is typically made based upon current traffic patterns.

The intelligent routing of data packets with resultant reduction in network congestion can only be effected if the network topology is known. The topology of a network is a description of the network which includes the location of and interconnections between nodes on the network. The word "topology" refers to either the physical or logical layout of the network, including devices, and their connections in relationship to one another. Information necessary to create the topology layout can be derived from tables stored in network devices such as hubs, bridges, and switches. The information in these tables is in a constant state of flux as new entries are being added and old entries time out. Many times there simply is not enough information to determine where to place a particular device.

Switches examine each data packet that they receive, read the source addresses, and log those addresses into tables along with the switch ports on which the packets were received. If a packet is received with a target address without an entry in the switches table, the switch receiving it broadcasts that packet to each of its ports. When the switch receives a reply, it will have identified where the new node lies.

In a large network with multiple possible paths from the switch to the target node, this table can become quite large and may require a significant amount of the switch's resources to develop and maintain. As an additional complication, the physical layout of devices and their connections are typically in a state of constant change. Devices are continually being removed from, added to, and moved to new physical locations on the network. To be effectively managed, the topology of a network must be accurately and efficiently ascertained, as well as maintained.

Existing mapping methods have limitations that prevent them from accurately mapping-topological relationships. Multiple connectivity problems are one sort of difficulty encountered by existing methods. For example, connectors such as routers, switches, and bridges may be interconnected devices in a network. Some existing methods assume that these devices have only a single connection between them. In newer devices, however, it is common for manufacturers to provide multiple connections between devices to improve network efficiency and to increase capacity of links between the devices. The multiple connectivity allows the devices to maintain connection in case one connection fails. Methods that do not consider multiple connectivity do not present a complete and accurate topological map of the network.

Another limitation of existing topology methods is the use of a single reference to identify a device. Existing methods use a reference interface or a reference address in a set of devices to orient all other devices in the same area. These methods assumed that every working device would be able to identify, or "hear," this reference and identify it with a particular port of the device. With newer devices, however, it is possible that the same address or reference may be heard out of multiple ports of the same device. It is also possible that the address or reference may not be heard from any ports, for example, if switching technology is used.

Still another limitation of existing mapping systems is that they require a complete copy of the topological database to be stored in memory. In larger networks, the database is so large that this really is not feasible, because it requires the computer to be very large and expensive.

Still another difficulty with existing systems is that they focus on the minutia without considering the larger mapping considerations. Whenever an individual change in the system is detected, existing methods immediately act on that change, rather than taking a broader view of the change in the context of other system changes. For example, a device may be removed from the network temporarily and replaced with its ports reversed. In existing systems, this swapped port scenario could require hundreds or thousands of changes because the reference addresses will have changed for all interconnected devices.

Still another disadvantage of existing methods is that they use a continuous polling paradigm. These methods continuously poll network addresses throughout the day and make decisions based on those continuous polling results. This creates traffic on the network that slows other processes.

Still another limitation of existing methods is the assumption that network parts of a particular layer would be physically separated from other parts. Network layer 1 may represent the physical cabling of the network, layer 2 may represent the device connectivity, and layer 3 may represent a higher level of abstraction, such as the groupings of devices into regions. Existing methods assume that all layer 3 region groupings are self-contained, running on the same unique physical networking. However, in an internet protocol (IP) network, multiple IP domains may co-exist on the same lower layer networking infrastructure. It has become common for a network to employ a virtual local area network (LAN) to improve security or to simplify network maintenance, for example. Using virtual LANs, a system may have any number of different IP domains sharing the same physical connectivity. As a result, existing methods create confusion with respect to topological mapping because networks with multiple IP addresses in different subnets for the infrastructure devices cannot be properly represented because they assume the physical separation of connectivity for separate IP domains. Still another limitation of existing methods is that they do not allow topological loops, such as port aggregation or trunking, and switch meshing.

SUMMARY OF INVENTION

A method and system are disclosed for mapping the topology of a network having interconnected nodes by identifying changes in the network and updating a stored network topology based on the changes. The nodal connections are represented by data tuples that store information such as a host identifier, a connector interface, and a port specification for each connection. A topology database stores an existing topology of a network. A topology converter accesses the topology database and converts the existing topology into a list of current tuples. A connection calculator calculates tuples to represent connections in the new topology. The topology converter receives the new tuples, identifies changes to the topology, and updates the topology database using the new tuples. The topology converter identifies duplicate tuples that appear in both the new tuples and the existing tuples and marks the duplicate tuples to reflect that no change has occurred to these connections. The topology converter attempts to resolve swapped port conditions and searches for new singly-heard and multi-heard host link tuples in the list of existing tuples. The topology converter also searches for new conflict link tuples in the existing tuples. The topology converter updates the topology database with the new topology.

SUMMARY OF DRAWINGS

FIGS. 12a–d are flow charts of an infrastructure-building phase of the method used by the connection calculator.

FIG. 15 is a flow chart of the look-for phase of the method used by the connection calculator.

FIGS. 16a–b are flow charts of the consolidation phase of the method used by the connection calculator.

DETAILED DESCRIPTION

The system provides an improved method for creating topological maps of communication networks based. Connectivity information is retrieved from the network nodes and stored as "tuples" to track specifically the desired information necessary to map the topology. These light weight data structures may store the host identifier, interface index, and a port. From this tuple information, the topology may be determined. A tuple may be a binary element insofar as it has two parts representing the two nodes on either end of a network link or segment. A "tuco" refers to a tuple component, such as half of a binary tuple.

As used herein, a node is any electronic component, such as a connector or a host, or combination of electronic components with their interconnections. A connector is any network device other than a host, including a switching device. A switching device is one type of connector and refers to any device that controls the flow of messages on a network. Switching devices include, but are not limited to, any of the following devices: repeaters, hubs, routers, bridges, and switches.

As used herein, the term "tuple" refers to any collection of assorted data. Tuples may be used to track information about network topology by storing data from network nodes. In one use, tuples may include a host identifier, interface information, and a port specification for each node. The port specification (also described as the group/port) may include a group number and a port number, or just a port number, depending upon the manufacturer's specifications. A binary tuple may include this information about two nodes as a means of showing the connectivity between them, whether the nodes are connected directly or indirectly through other nodes. A "conn-to-conn" tuple refers to a tuple that has connectivity data about connector nodes. A "conn-to-host" tuple refers to a tuple that has connectivity data about a connector node and a host node. In one use, tuples may have data about more than two nodes; that is, they may be n-ary tuples, such as those used with respect to shared media connections described herein.

A "singly-heard host" (shh) refers to a host, such as a workstation, PC, terminal, printer, other device, etc., that is connected directly to a connector, such as a switching device. A singly heard host link (shhl) refers to the link, also referred to as a segment, between a connector and an shh. A "multi-heard host" (mhh) refers to hosts that are heard by a connector on the same port that other hosts are heard. A multi-heard host link (mhhl) refers to the link between the connector and an mhh. A link generally refers to the connection between nodes. A segment is a link that may include a shared media connection.

Figure 1:
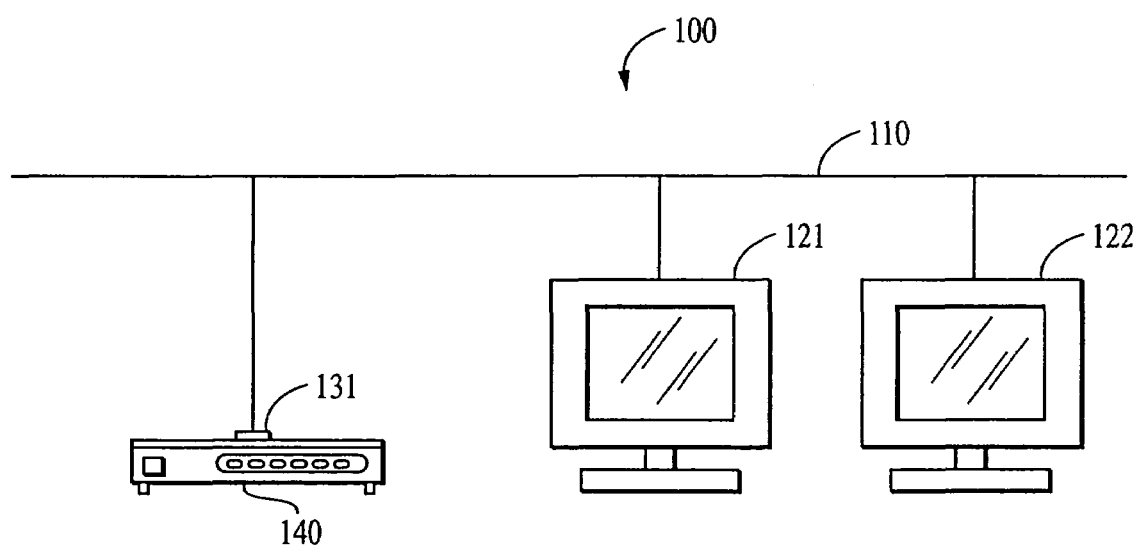
FIG. 1 is a drawing of a typical topological bus segment for representing the connectivity of nodes on a network.

FIG. 1 is a drawing of a typical topological bus segment 100 for representing the connectivity of nodes on a network 110. In FIG. 1, first and second hosts 121, 122, as well as a first port 131 of a first connector 140 are interconnected via the network 110. The bus segment 100 comprises the first and second hosts 121, 122 connected to the first port 131 of the first connector 140.

Figure 2:
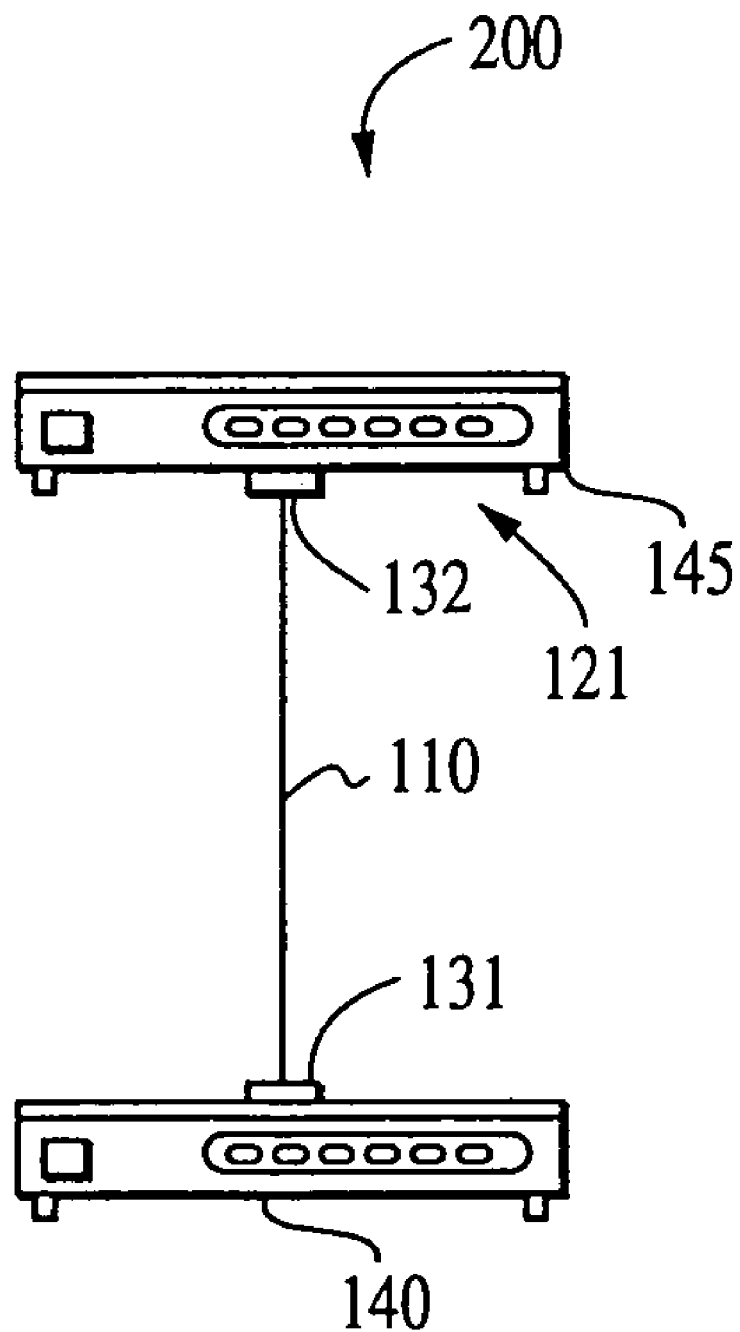
FIG. 2 is a drawing of a typical topological serial segment for representing the connectivity of nodes on a network.

FIG. 2 is a drawing of a typical topological serial segment 200 for representing the connectivity of nodes on the network 110. In FIG. 2, the first host 121 comprises a second port 132 on a second connector 145 which is connected via the network 110 to the first port 131 on the first connector 140. The serial segment 200 comprises the second port 132 on the second connector 145 connected to the first port 131 on the first connector 140. FIG. 2 is an example of a connector-to-connector ("conn-to-conn") relationship.

Figure 3:
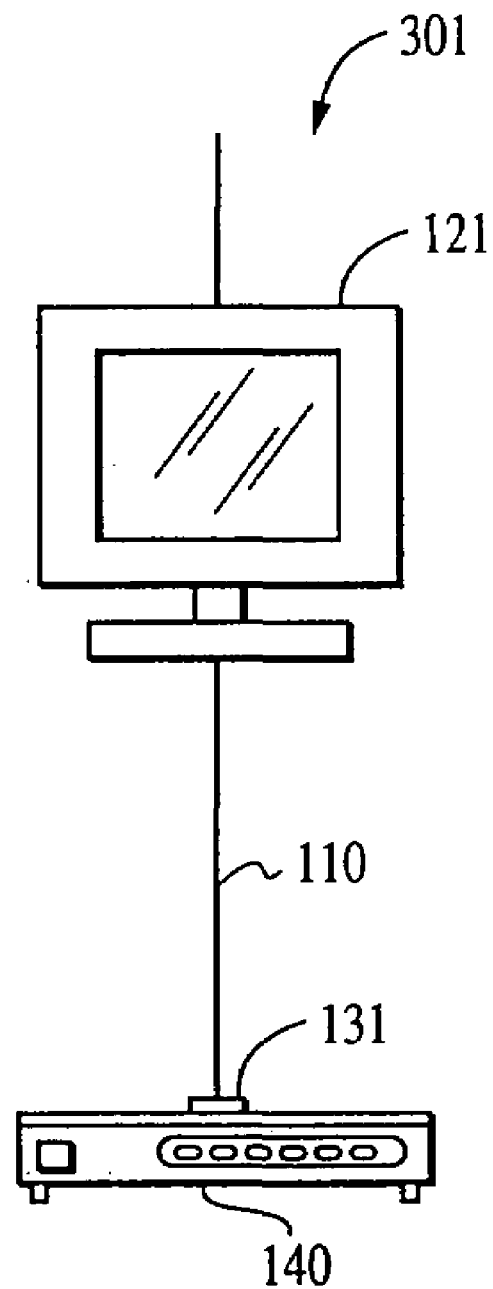
FIG. 3 is a drawing of a typical topological star segment for representing the connectivity of nodes on a network.

FIG. 3 is a drawing of a typical topological star segment 301 for representing the connectivity of nodes on the network 110. In FIG. 3, the first host 121 is connected to the first port 131 of the first connector 140. The star segment 301 comprises the first host 121 connected to the first port 131 of the first connector 140. FIG. 3 is an example of a connector-to-host ("conn-to-host") relationship.

Figure 4:
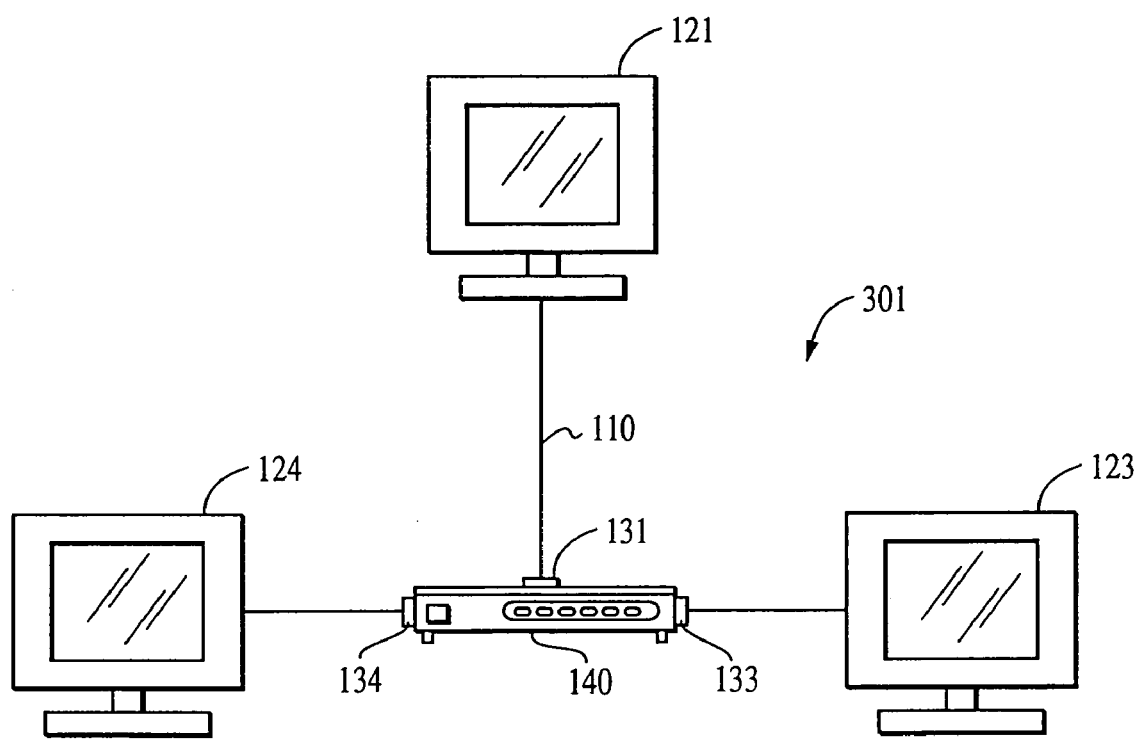
FIG. 4 is a drawing of another typical topological star segment for representing the connectivity of nodes on a network.

FIG. 4 is a drawing of another typical topological star segment 301 for representing the connectivity of nodes on the network 110. In addition to the connections described with respect to FIG. 3, a third host 123 is connected to a third port 133 of the first connector 140 and a fourth host 124 is connected to a fourth port 134 of the first connector 140. In FIG. 4, the star segment 301 comprises the first host 121 connected to the first port 131 of the first connector 140, the third host 123 connected to the third port 133 of the first connector 140, and the fourth host 124 connected to the fourth port 134 of the first connector 140. Thus, the star segment 301 comprises, on a given connector, at least one port, wherein one and only one host is connected to that port, and that host. In the more general case, the star segment 301 comprises, on a given connector, all ports having one and only one host connected to each port, and those connected hosts. Since the segments, or links, drawn using the topological methods of FIG. 4 resemble a star, they are referred to as star segments.

For illustrative purposes, nodes in the figures described above and in subsequent figures are shown as individual electronic devices or ports on connectors. Also, in the figures the nodes are represented as terminals. However, they could also be workstations, personal computers, printers, scanners, or any other electronic device that can be connected to networks 110.

Figure 5:
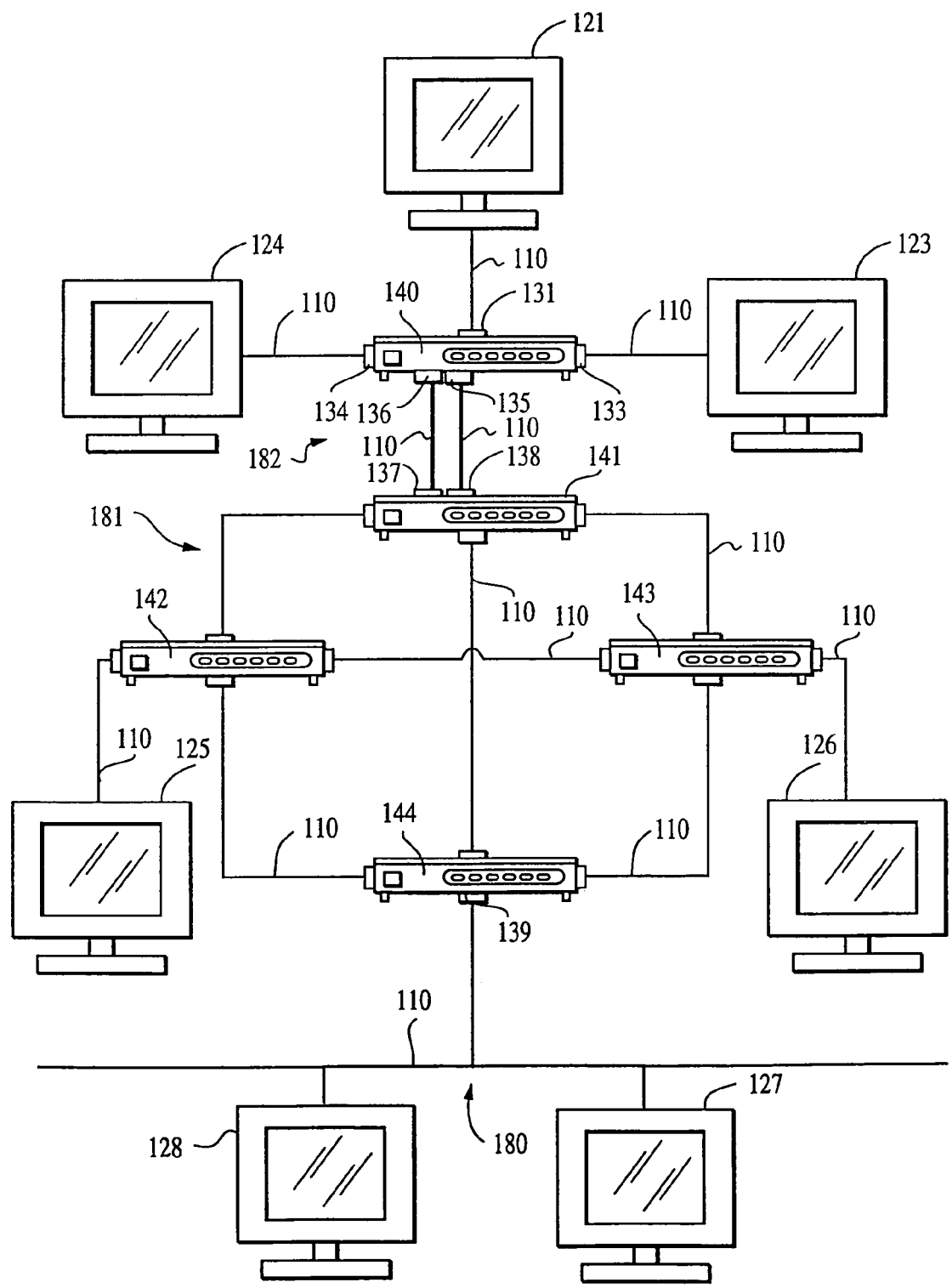
FIG. 5 is a drawing of the connectivity of an example network system.

FIG. 5 is a drawing of the connectivity of an example network system. In FIG. 5, first, third, and fourth hosts 121, 123, 124 are connected via the network 110 to first, third, and fourth ports 131, 133, 134 respectively, wherein the first, third, and fourth ports 131, 133, 134 are located on the first connector 140.

The first, third and fourth hosts 121, 123, 124 are singly-heard hosts connected to separate ports 131, 133, 134 of a common connector 140—the first connector 140. The fifth and sixth hosts 125, 126 are singly-heard hosts connected to the third and fourth connectors 142, 143. The seventh and eighth hosts 127, 128 are multi-heard hosts connected to the same port 139 of the fifth connector 144. The multi-heard hosts 127, 128 illustrate a shared media segment 180, also referred to as a bus 180.

The second, third, fourth, and fifth connectors 141, 142, 143, 144 are interconnected and illustrate a switch mesh 181. Each of the connectors in the switch mesh 181 is connected to each other, either directly or indirectly, to create a fully meshed connection. In the mesh, traffic may be dynamically routed to create an efficient flow.

FIG. 5 also shows an example of a port aggregation 182, also referred to as trunking 182. The first connector 140 is connected via the network 110 to the second connector 141 by two direct links, each of which is connected to different ports on the connectors. One link is connected to the sixth port 136 of the first connector 140 and to the seventh port of the second connector 137. The other link is connected to fifth port 135 of the first connector 140 and to the eighth port 138 of the second connector 141. In this example, two connectors illustrate the multiple connectivity between nodes. Depending upon the device specifications, devices such as connectors may be connected via any number of connectors.

As explained herein, the system resolves multiple connectivity problems by tracking port information for each connection.

Figure 6:
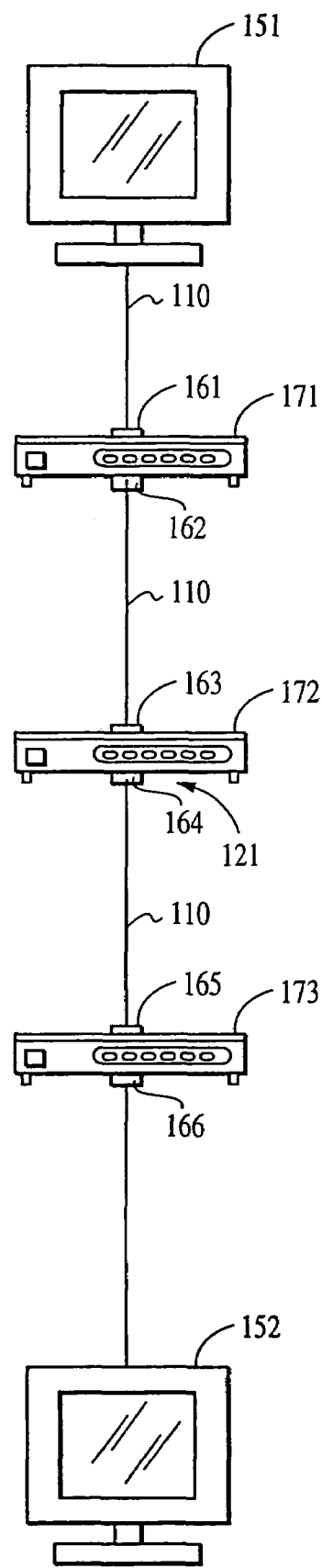
FIG. 6 is a drawing of the connectivity of another example network system.

FIG. 6 is a drawing of the connectivity of a portion of a network having three connectors 171, 172, 173. A first host 151 is connected directly to the first port 161 of the first connector 171 and the second host 152 is connected to a sixth port 166 of the third connector 173. The second port 162 of the first connector 171 is connected directly to the third port 163 of the second, or intermediate, connector 172. The fourth port 164 of the intermediate connector 172 is connected directly to the fifth port 165 of the third connector 173.

Figure 7:
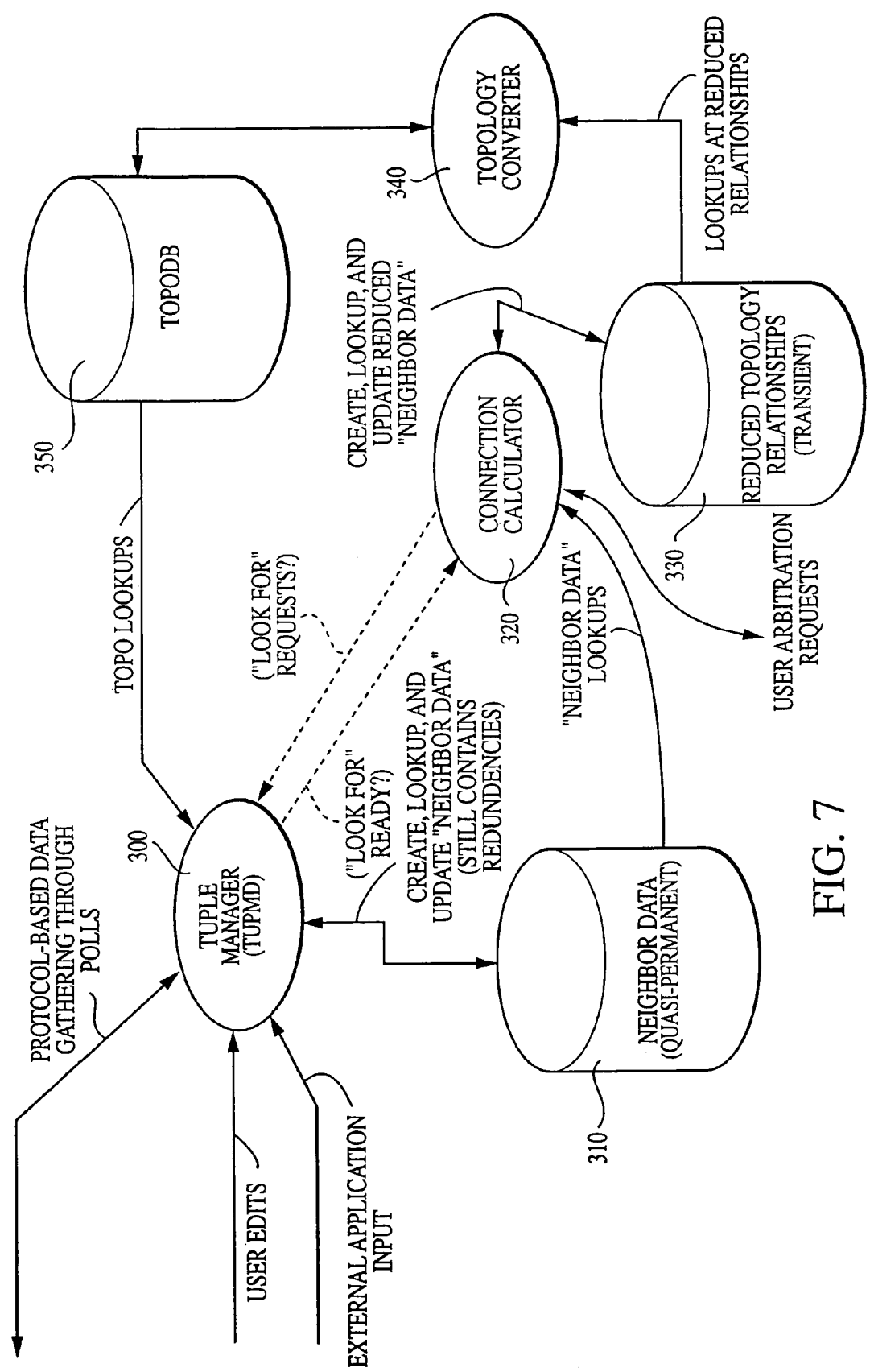
FIG. 7 is a block diagram of the system.
Figure 8:
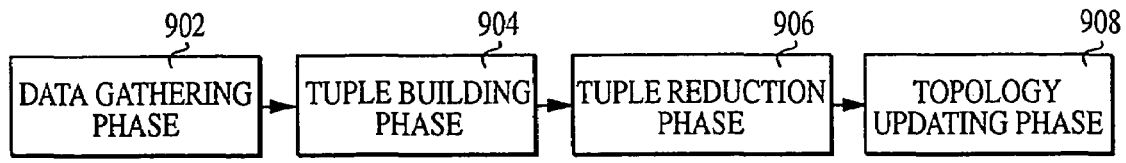
FIG. 8 is a flow chart of the method of the system.

FIG. 7 shows a block diagram of the system. FIG. 8 shows a flow chart of the method used by the system to retrieve and update the topology of the network. A tuple manager 300, also referred to as a data miner 300, gathers 902 data from network nodes and builds 904 tuples to update the current topology. The topology database "topodb" 350 stores the current topology for use by the system. The "neighbor data" database 310 stores new tuple data retrieved by the tuple manager 300. The connection calculator 320 processes the data in the neighbor data database 310 to determine the new network topology. The connection calculator 320 reduces 906 the tuple data and sends it to the reduced topology relationships database 330. The topology converter 340 then updates 908 the topology database 350 based on the new tuples sent to the reduced topology relationships database 330 by the connection calculator 320.

Figure 9:
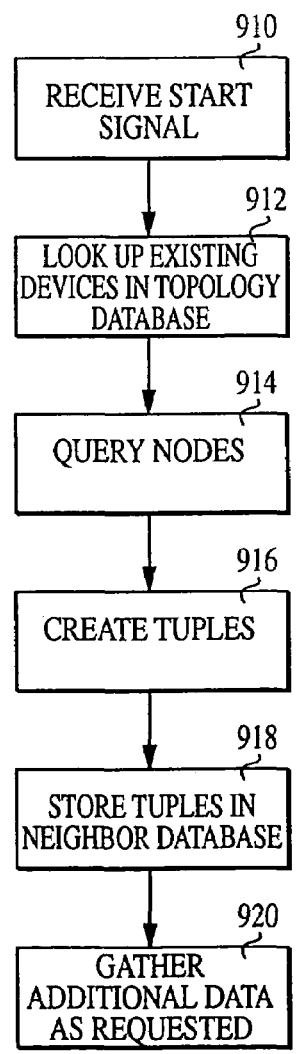
FIG. 9 is a flow chart of the method used by the tuple manager.

FIG. 9 shows a flow chart of one operation of the tuple manager 300, as described generally by the data gathering 902 and tuple building 904 steps of the method shown in FIG. 8. The tuple manager 300 receives 910 a signal to gather tuple data. The tuple manager 300 then retrieves 912 node information of the current topology stored in the topology database 350. This information tells the tuple manager 300 which devices or nodes are believed to exist in the system based on the nodes that were detected during a previous query. The tuple manager 300 then queries 914 the known nodes to gather the desired information. For example, the connectors may maintain forwarding tables that store connectivity data used to perform the connectors' ordinary functions, such as switching. Other devices may allow the system to perform queries to gather information about the flow of network traffic. This data identifies the devices heard by a connector and the port on which the device was heard. The tuple manager 300 gathers this data by accessing forwarding tables and other information sources for the nodes to determine such information as their physical address, interface information, and the port from which they "hear" other devices. Based on this information, the tuple manager 300 builds 916 tuples and stores 918 them in the "neighbor data" database 310. Some nodes may have incomplete information. In this case, the partial information is assembled into a tuple and may be used as a "hint" to determine its connectivity later, based on other connections. The tuple manager 300 may also gather 920 additional information about the network or about particular nodes as needed. For example, the connection calculator 320 may require additional node information and may signal the tuple manager 300 to gather that information.

Figure 10:
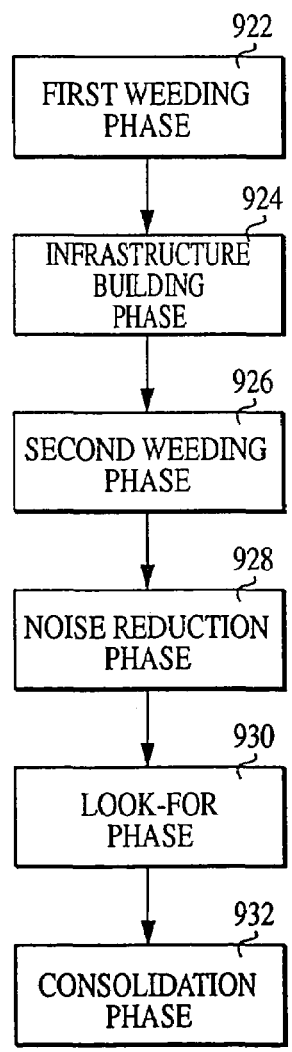
FIG. 10 is a flow chart of the method used by the connection calculator.

After the data is gathered and the tuples are stored in the neighbor database 310, the connection calculator 320 processes the tuples to reduce them to relationships in the topology. FIG. 10 shows a flow chart of the process of the connection calculator 320, as shown generally in the reduction step 906 of the method shown in FIG. 8. The connection calculator 320 performs a first weeding phase 922 to identify singly-heard hosts to distinguish them from multi-heard hosts. Singly-heard hosts refer to host devices connected directly to a connector. The connection calculator 320 then performs an infrastructure-building phase 924 to remove redundant connector-to-connector links and to complete the details for partial tuples that are missing information. Then, the connection calculator 320 performs a second weeding phase 926 to resolve conflicting reports of singly-heard hosts. The connection calculator 320 then performs a noise reduction phase 928 to remove redundant neighbor information for connector-to-host links. If clarification of device connectivity is required, the connection calculator 320 performs a "look for" phase 930 to ask the tuple manager 300 to gather additional data. The tuple data is then consolidated 932 into segment and network containment relationships. The connection calculator 320 may also tag redundant tuples to indicate their relevance to actual connectivity. These redundant tuples may still provide hints to connectivity of other tuples. As part of the consolidation phase 932, the connection calculator 320 creates new n-ary tuples (tuples having references to three or more tucos) for shared media segments.

Figure 11:
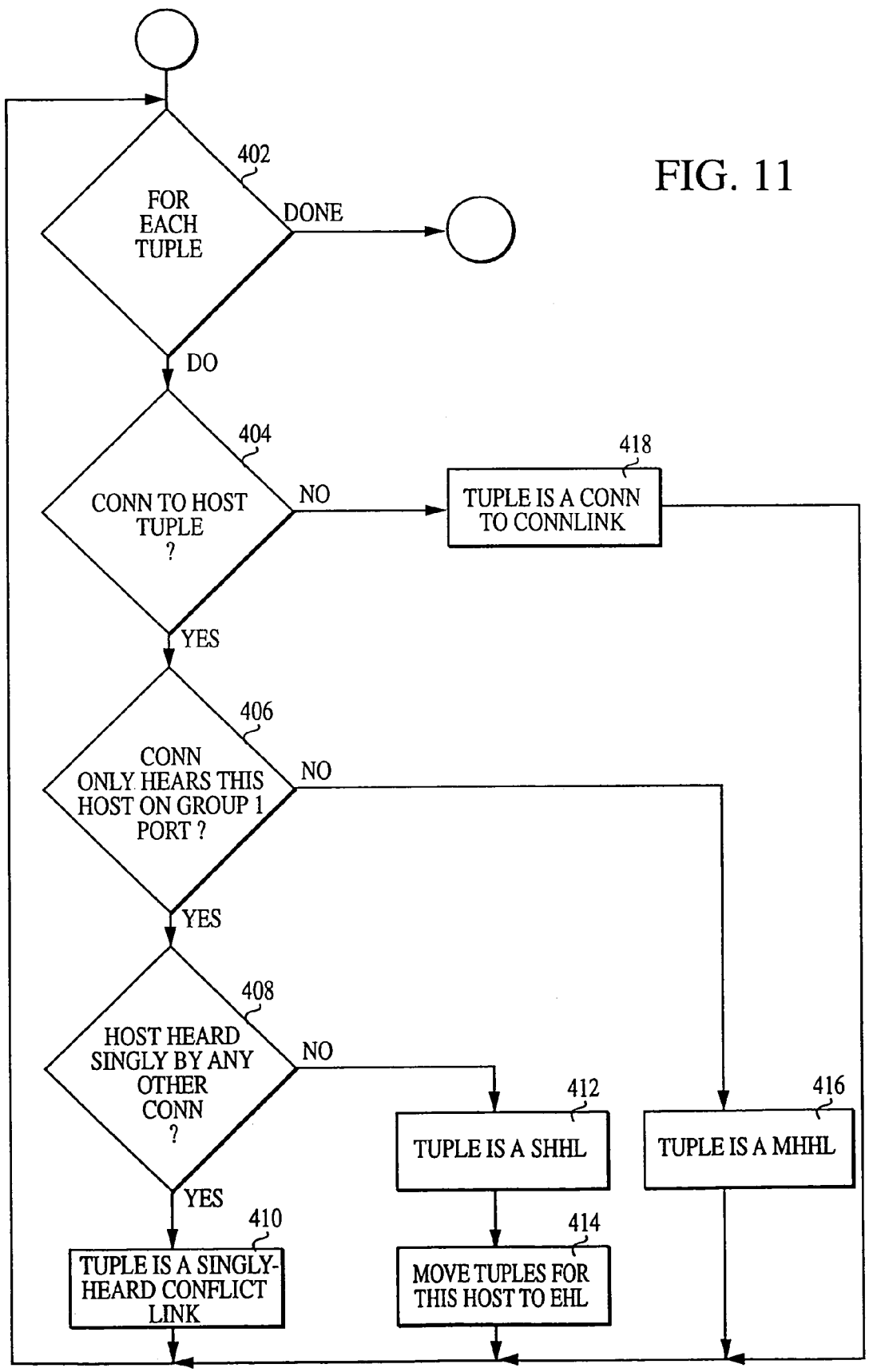
FIG. 11 is a flow chart of the first weeding phase of the method used by the connection calculator.
Figure 12A:
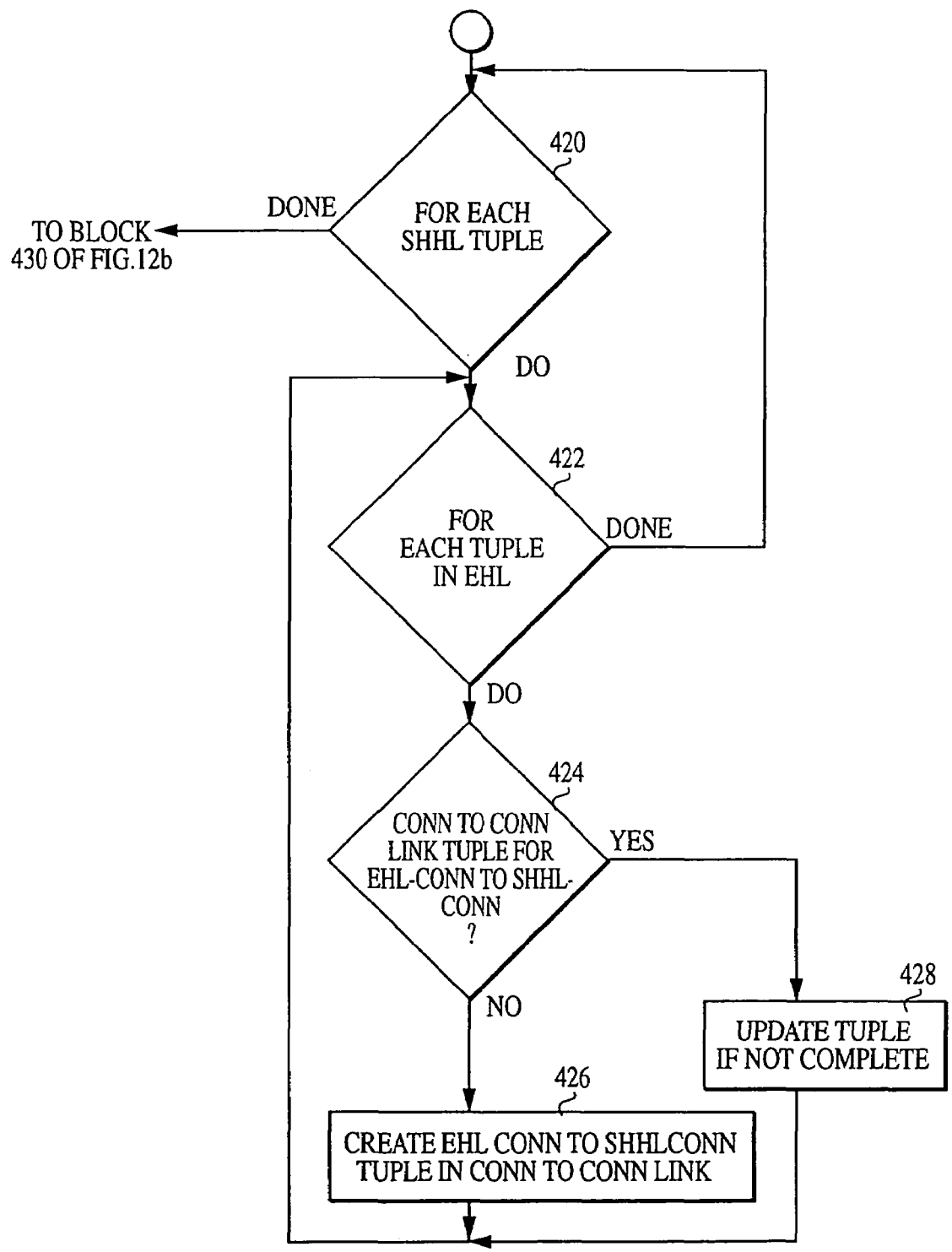
Figure 12C:
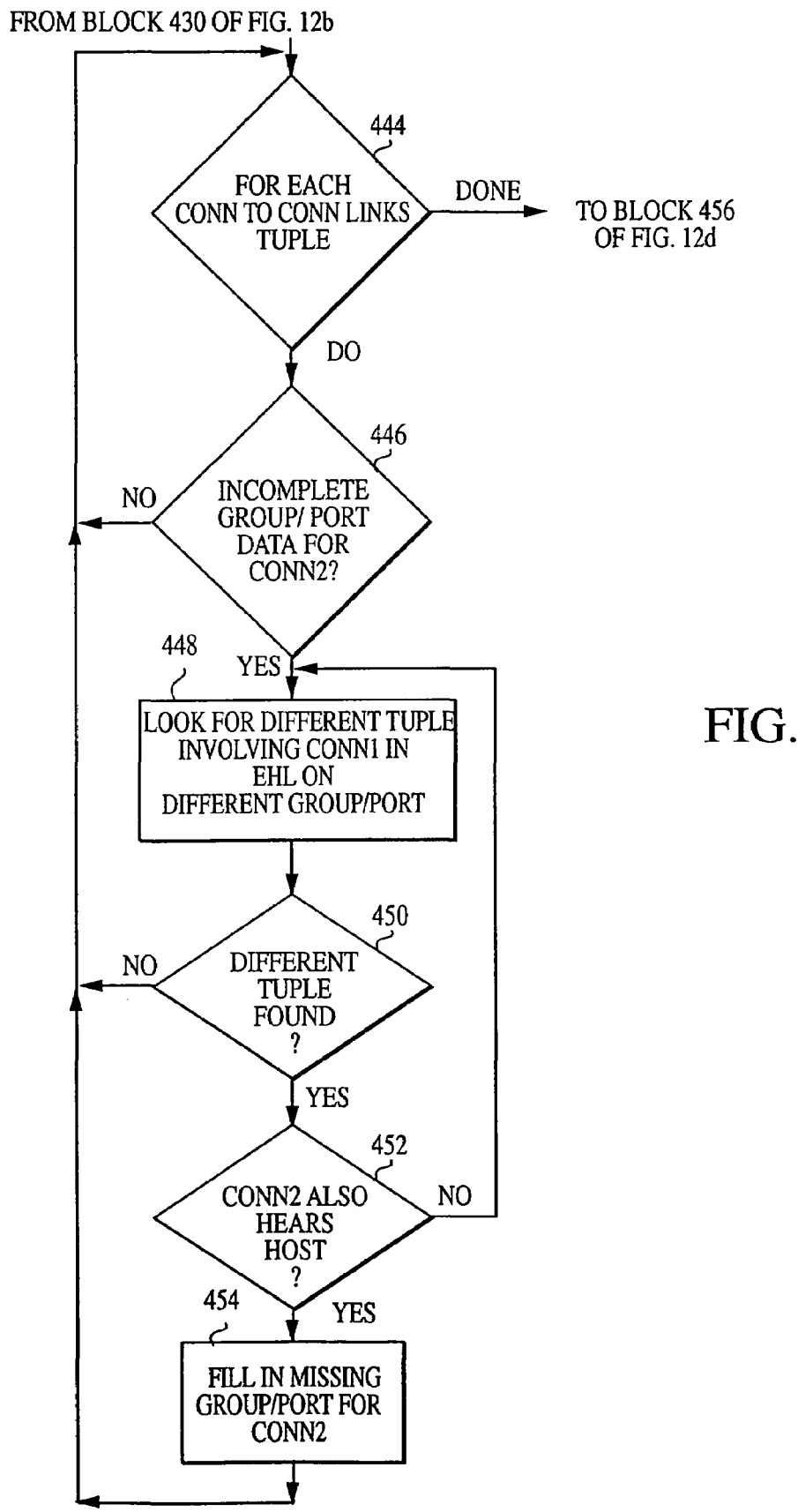
Figure 12D:
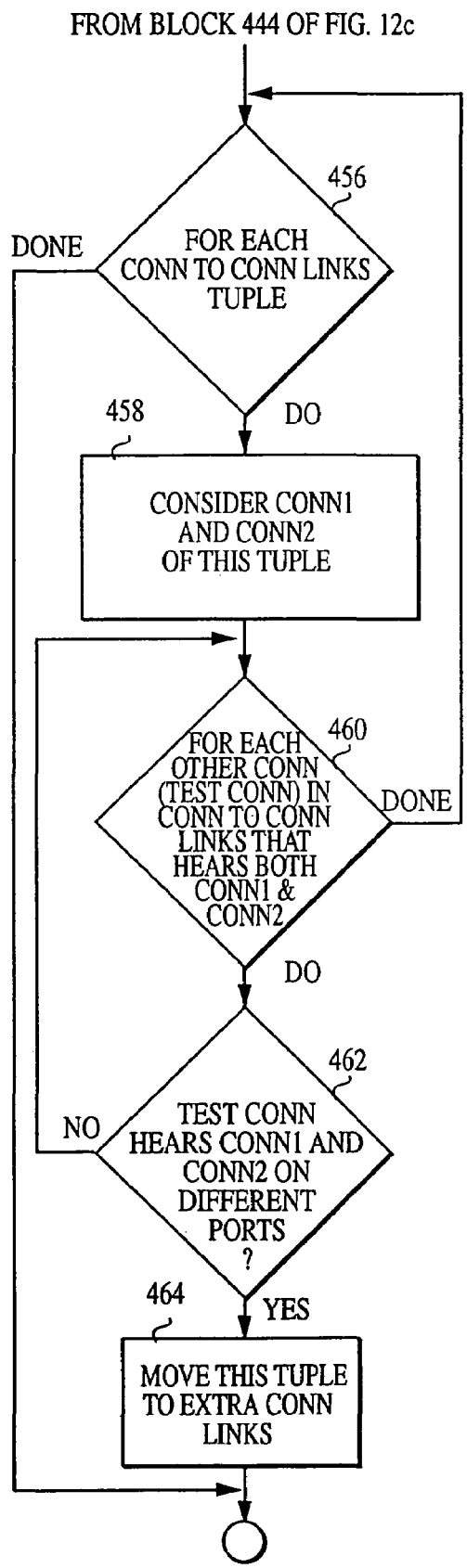

FIG. 11 is a flow chart of the connection calculator's first weeding process 922 for distinguishing singly-heard hosts. The purpose of the first weeding process 922 is to identify the direct connections between connectors and hosts; that is, those tuples having a first tuco that is a connector and a second tuco that is a host. The connection calculator 320 looks through the tuple list in the neighbor database 310, and for each tuple 402, the connection calculator 320 determines 404 whether the tuple is a connector-to-host (conn-to-host) link tuple. If it is not a conn-to-host link, the connection calculator 320 concludes 418 that it is a conn-to-conn link and processes 402 the next tuple. If the tuple is a conn-to-host link tuple, then the connection calculator 320 determines 406 whether the connector hears only this particular host on the port identified in the tuple. If the connector hears other hosts on this port, then the tuple is classified 416 as a multi-heard host link (mhhl) tuple.

If the connector hears only the one host on the port—that is, if the host is a singly-heard host—then the connection calculator 320 determines 408 whether the host is heard singly by any other connectors. If no other connectors hear the host as a singly-heard host, then the tuple is classified as a singly-heard host link (shhl) tuple 412 and other tuples for this host are classified 414 as extra host links (ehl). Another tuple for this host may be, for example, an intermediate connector connected indirectly to a host. For example, FIG. 6 shows three connectors 171, 172, 173 the first connector is connected directly to the first host 151. This connection therefore forms an shhl tuple. The intermediate connector 172 is indirectly connected to the first host 151. The tuple data indicates that the intermediate connector 172 is indirectly connected to the host and hears the host from a particular port. An extra host links tuple is created so that this data may be used later in conjunction with other extra host links tuples from devices across the network, to verify connectivity by providing hints about connections.

The first weeding process also attempts to identify conflicts. If other connectors hear the host as a singly-heard host, then a conflict arises and the tuple is classified 410 as a singly-heard conflict link (shcl) tuple to be resolved later. This conflict may arise, for example, if a host has been moved within the network, in which case the forwarding table data may no longer be valid. Certain connectors previously connected directly to the host may still indicate that the moved host is connected. When all tuples have been processed 402 to identify singly-heard host links, the first weeding phase 922 is complete.

FIGS. 12a–d show a flow chart of the infrastructure building phase 924 of the connection calculator 320. The purpose of the infrastructure building phase 924 is to determine how the connectors are set up in the network. The first part of the infrastructure building phase 924 manufactures tuples based on the list of singly-heard host link tuples identified in the first weeding phase 922. The purpose is to identify the relationship between the connectors in the extra host links tuples and the connectors directly connected to the singly-heard hosts. For each singly-heard host link 420, the connection calculator 320 processes 422 each extra host link that refers to the host. In the illustration of FIG. 6, a conn-to-conn link tuple would represent the connection between the first connector 171 and the intermediate connector 172. An extra host link tuple would represent the indirect connection between the intermediate connector 172 and the first host 151. The conn-to-conn link tuple between the first connector 171 and the intermediate connector 172 is an example of an ehlConn-to-shhlConn tuple. If a conn-to-conn link tuple exists 424 for the extra host link connector to the singly-heard host link connector (ehlConn-to-shhlConn), then the connection calculator 320 updates 428 the tuple if it is incomplete. It is possible that the tuple data may be incomplete and a conn-to-conn link may not exist. In that case, a conn-to-conn tuple does not exist for the ehlConn-to-shhlConn, then such a tuple is created 426.

After processing extra host links for singly-heard host links, the connection calculator 320 considers 430 each connector (referred to as conn1) in the tuples to determine the relationship between connectors. As illustrated in FIG. 6, a single connector may be connected directly and indirectly to multiple other connectors. In FIG. 6, the first connector 151 is connected to the intermediate connector 171 directly and also to the third connector 173 indirectly. The third connector 173 hears the first host 151 on the same part 165 that it hears the first connector 171 and the intermediate connector 172. The infrastructure building phase 924 tries to determine the relationship between other connectors heard on the same port of conn1. In a series of interconnected connectors, the connector on one end may not hear a connector on another end, but it may hear intermediate connectors, that in turn hear their own intermediate connectors. Tuples are created to represent the interconnection of conn-to-conn relationships. Based on this data, the connection calculator 320 can make inferences regarding the overall connection between connectors.

For every conn1, the connection calculator 320 considers 432 every other connector (conn2) to determine whether a conn1-to-conn2 tuple exists. If conn1-to-conn2 does not exist, then the connection calculator 320 considers 436 every other conn-to-conn tuple containing conn2. The other connector on this tuple may be referred to as conn3. If conn2 hears conn3 on a unique port 438 and if conn1 also hears conn3 440, then the connection calculator 320 creates 442 a tuple for conn1-to-conn2 in the connector-to-connector links tuple list.

After processing all of the conn1 tuples, the connection calculator 320 processes 444 each conn1-to-conn2 links tuple to ensure that they have complete port data. For each incomplete tuple 446, the connection calculator 320 looks 448 for a different tuple involving conn1 in the extra host links tupleson a different port. If a different tuple is found 450, then the connection calculator 320 determines 452 whether conn2 also hears the host. If conn2 does hear the host, then the connection calculator 320 completes the missing port data for conn2. If conn2 does not also hear the host 452, then the connection calculator 320 continues looking 448 through different tuples involving conn1 in extra host links on different ports.

After attempting to complete the missing data in each of the conn-to-conn links tuples, the connection calculator 320 processes 456 each conn-to-conn links tuple. The purpose of this sub-phase is to attempt to disprove invalid conn-to-conn links. The connection calculator 320 considers 458 conn1 and conn2 of each conn-to-conn links tuple. Every other connector in conn-to-conn links may be referred to as testconn. For each testconn 460, the connection calculator 320 determines 462 whether the testconn hears conn1 and conn2 on different groups/ports. If testconn hears conn1 and conn2 on different ports, then the tuple is moved to extra-connlinks (ecl) 464. Otherwise, the connection calculator 320 continues processing 460 the remaining testconns.

Figure 13:
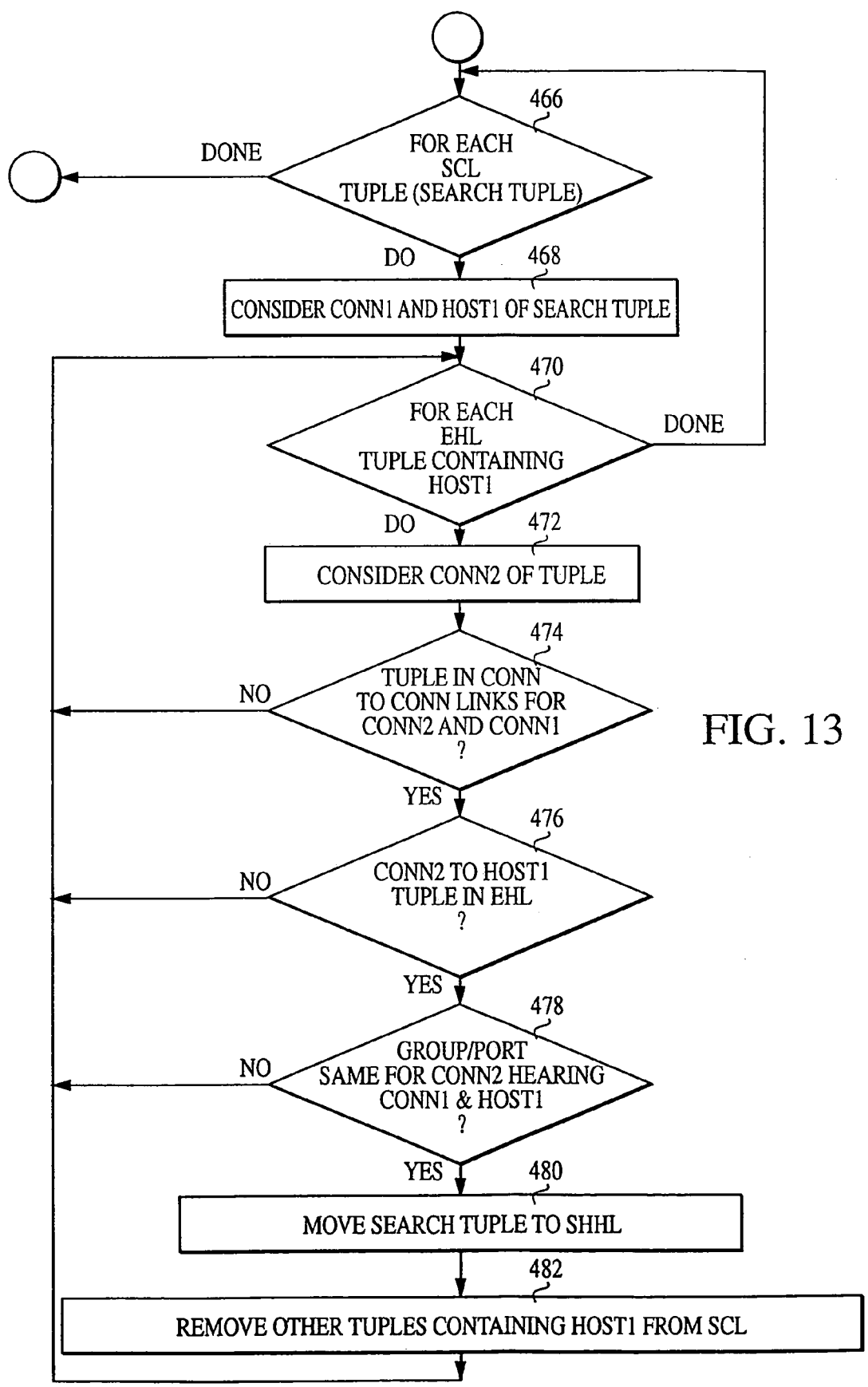
FIG. 13 is a flow chart of a second weeding phase of the method used by the connection calculator.

FIG. 13 shows a flow chart of the second weeding phase 926. The purpose of the second weeding phase 926 is to attempt to resolve conflicts involving singly-heard hosts identified in the first weeding phase 922. In the situation described herein in which more than one connector reports that a host is singly-heard, the second weeding phase 926 reviews the tuples created during the infrastructure-building phase 924 involving the connector and host in question and attempts to disprove the reported conflict. The connection calculator 320 processes 466 each singleConflictLinks (scl) tuple (sometimes referred to as the search tuple) and considers 468 conn1 and host1 of the tuple. For each extra host links tuple containing host1 470, the connection calculator 320 considers 472 conn2 of the tuple. If there is a tuple in conn-to-conn links for conn2 and conn1 474, and if there is a conn2-to-conn1 tuple in the extra host links tuples 476, and if the port is the same for conn2 hearing conn1 and host1 478, then the search tuple is moved 480 into the singly heard host links and other tuples containing host1 are removed 482 from the singleConflictLinks.

Figure 14:
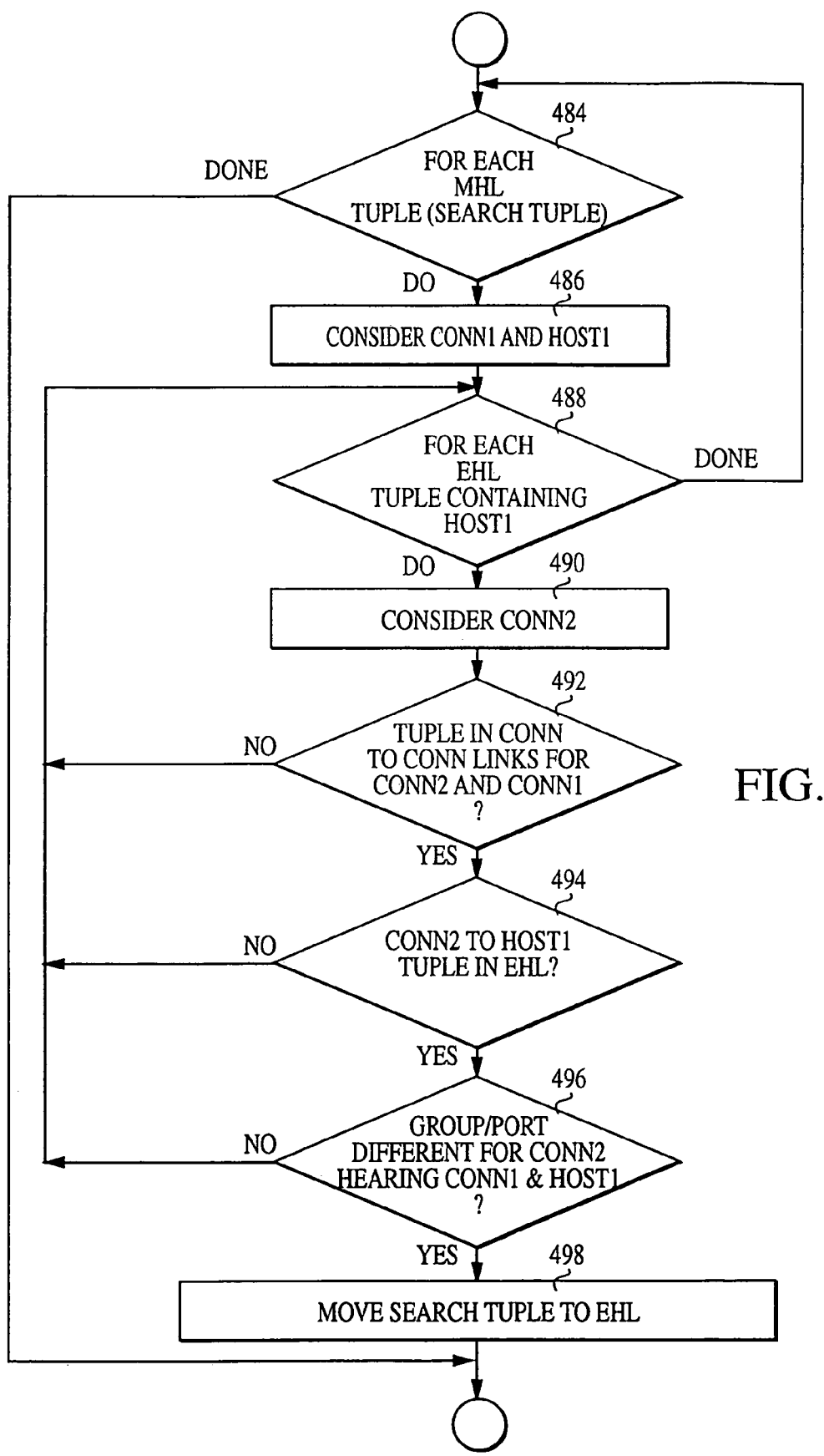
FIG. 14 is a flow chart of the noise reduction phase of the method used by the connection calculator.

FIG. 14 shows a flow chart of the noise reduction phase 928. The purpose of the noise reduction phase 928 is to handle those connections in which a connector is not directly connected to a host or to another connector. For example, networking technology may employ shared media connections between connectors, rather than dedicated media connectors. With a shared media connection, the entries in the forwarding tables for connectors attached to the shared media connection will include every node accessing the shared media connection and may not present a useful or accurate representation of the nodal connection. For example, if the network configuration in FIG. 6 used a shared media connection between the first connector 171 and the intermediate connector 172, then the first connector is not really connected directly to the intermediate connector because other devices (not shown in FIG. 6) may also use the shared media connection. These other devices may include web servers, other connectors, other subnetworks, etc. Tuples will be created for the connectors 171, 172 on opposing ends of the shared media. In this situation, it is inefficient to maintain point-to-point binary tuples for every connection. The noise reduction phase 928 disproves invalid tuples created by the shared media connections.

For each multi-heard host links (mhhl) tuple, also referred to as multiHeardLinks (mhl) tuples (sometimes referred to as the search tuple) 484, conn1 and host1 are considered 486. For each extra host links tuple containing host1 488, conn2 is considered 490. If there is a tuple in conn-to-conn links for conn2 and conn1 492, and if there is a conn2-to-host1 tuple in extraHostLinks 494, and if the group/port for conn2 hearing conn1 and host1 is different 496, then the search tuple is moved 498 to extraHostLinks.

FIG. 15 shows a flow chart for the "look for" phase 930. The purpose of this phase is to complete missing data for mhhl tuples. There may exist connections on the network that have incomplete tuple data. For example, the network may simply have no traffic between certain nodes, in which case data might not be stored in forwarding tables. In another example, a forwarding table may not have sufficient room to store all of the required information and might delete data on a FIFO basis. In the look for phase 930, the connection calculator 320 instructs the tuple manager 300 to query specific nodes to retrieve the missing data. Data that was not stored in a forwarding table on the first interrogation may be present on a subsequent query. For each mhhl tuple 500, the connection calculator 320 considers 502 conn1 and host1. If the conn1 group/port is already in an "alreadyDidLookfors" list, then a list is created 508 for all connectors in conn-to-conn links that are heard by conn1 on the same group/port as host1. For each connector (conn2) in the list 510, the connection calculator 320 determines 512 whether there is a conn2-to-host1 tuple in the mhhl tuples. If there is not such a tuple, then the connection calculator 320 initiates a look-for for conn2-to-host1 via the tuple manager 300. When each connector in the list has been processed 510, the conn1 group/port tuco is added 516 to an alreadyDidLookfors list. As an additional portion of the look for phase 930 (not shown in figures) the system may ask a user to verify or clarify information about connectivity. For example, the system may show the user the perceived connectivity or the unresolved connectivity issues and request the user to add information as appropriate.

The connection calculator 330 process described above collects the tuple information from the tuple manager 300, builds tuples new tuples and removes redundant or unnecessary tuples to produce the new topology. This topology may have incomplete tuples possibly resulting from extraneous information that the connection calculator 330 could not disprove. To refine the new topology, the connection calculator 330 can request the tuple manager 300 to obtain additional information about particular nodes or it may also request a user to refine the topology by adding or removing tuples. Using the process of the connection calculator 330, tuples marked as non-essential may be removed from the new topology to save space and to simply the topology. The connection calculator 330 is not confused by multiple connectivity situations such as port aggregation 182 or switch meshing 181 as shown in FIG. 5, because the tuples represent point-to-point, or neighbor-to-neighbor, connectivity showing each connection in the network. This point-to-point connectivity concept also helps enable the system to avoid difficulties that occur in systems that track higher levels of abstraction, such as layer 3 connectivity. Also, the tuples may contain only selected information to minimize the storage space required for the topology.

Figure 16B:
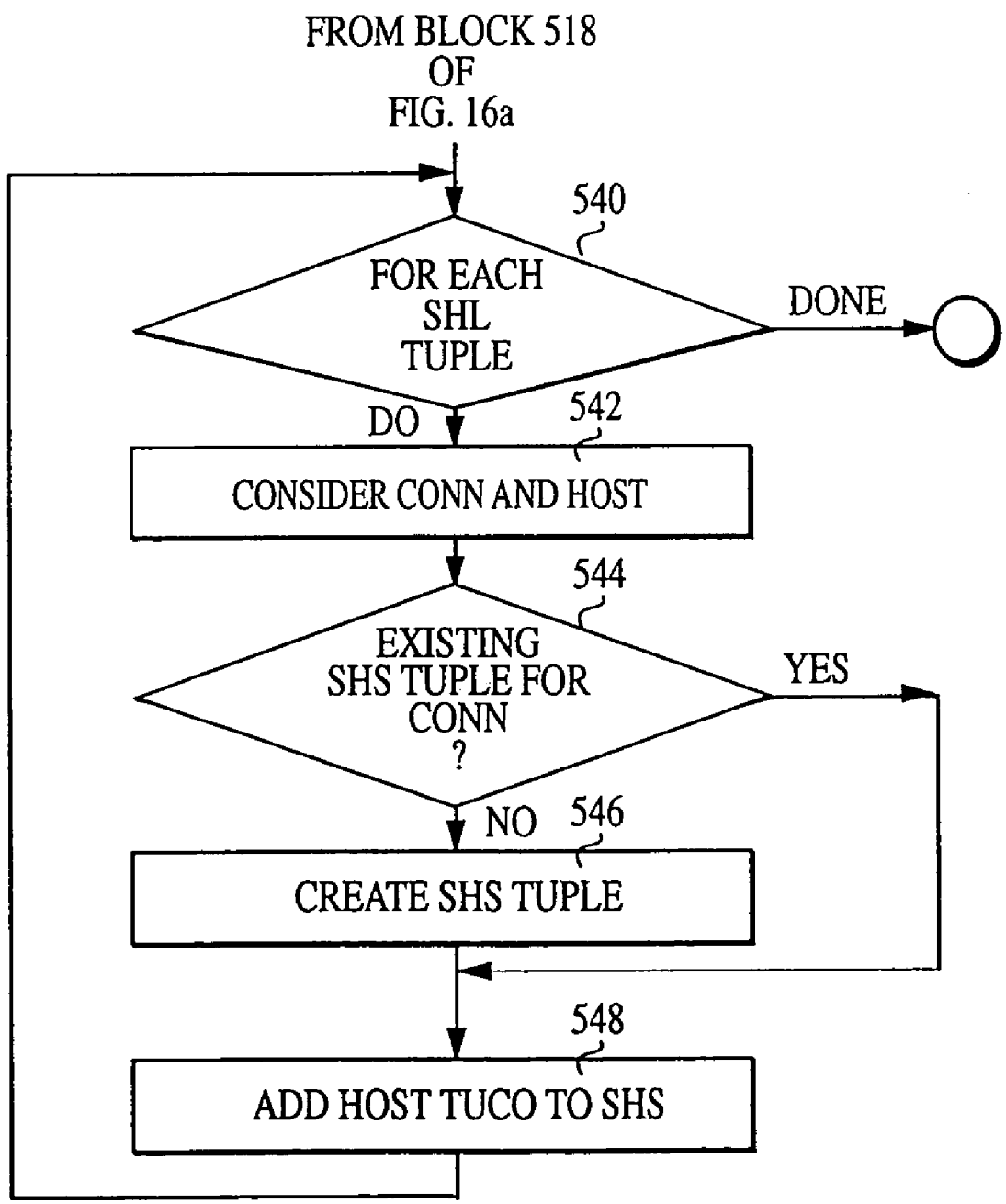

FIGS. 16a–b show a flow chart of the consolidation phase 932. The purpose of this phase is to consolidate the tuples that involve shared media connections. After the noise reduction phase 928, a considerable number of tuples involving shared media may remain. Rather than maintain a binary tuple for each of the connections, an n-ary tuple is created for the link using a tuco for each connector and each host connected thereto. For each mhhl tuple 518, conn1 and host1 are considered 520. If there are more conn1 group/port tuples in multiHeardLinks, and if are not any n-ary multi-HeardSegments (mhs) tuples 524, then an mhs tuple is created 526. If host1 is not already in this particular mhs tuple 528, then conn2 of the tuple is considered 534. If there is a conn1-to-conn2 conn-to-connLinks tuple on the same port as conn1-to-host1 536, then all multiHeardLinks tuples for conn2-to-host1 with the same conn2 group/port as the conn 1-to-conn2 are added 538 to the current mhs tuple.

After processing each mhhl tuple 518, each singly-heard host links (shhl) tuple, also referred to as a singlyHeardLinks (shl) tuple, is considered 540. For each shhl tuple, the connector and host are considered 542. If there is no existing singlyHeardSegments (shs) tuple for the connector 544, then an shs tuple is created 546. The host tuco is then added to the shs 548.

Figure 17:
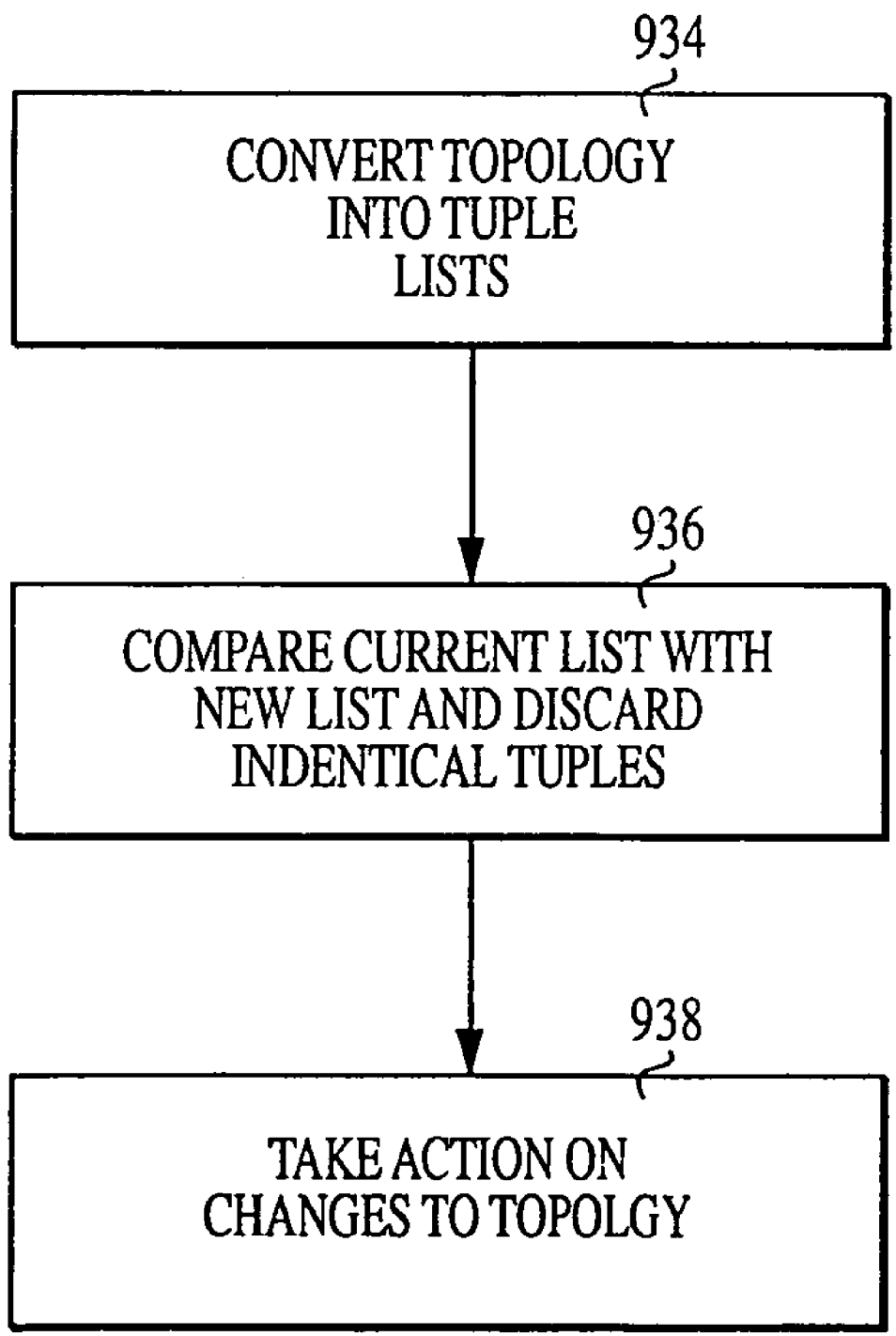
FIG. 17 is a flow chart of the method used by the topology converter.

FIG. 17 shows a flow chart of the method used by the topology converter 340, as described generally by the topology update step 908 of the method shown in FIG. 8. The topology converter 340 converts 934 the topology into tuple lists, also referred to as the "morph topo" phase 934. It then compares 936 the list from the topology currently stored in the topology database 350 with the new list generated by the connection calculator 320 and discards 936 identical tuples in what is also referred to as the "discard duplicates" phase 936. It then takes action 938 on the changes in the topology as determined by the changes in the tuple lists, in what is also referred to as the "identify different tuples" phase 938.

Figure 18A:
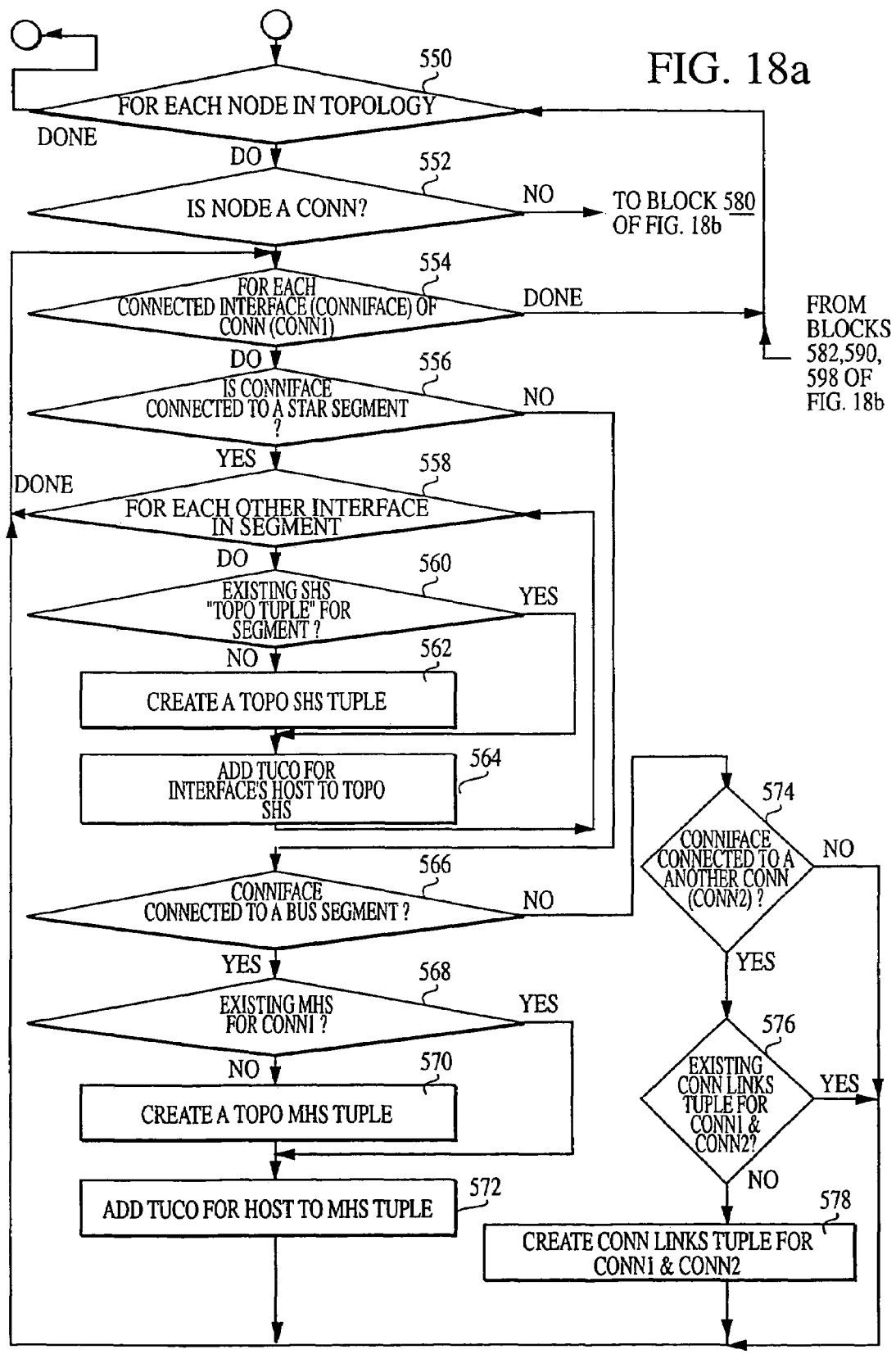
FIGS. 18a–b are flow charts of the morph topo phase of the method used by the topology converter.

FIG. 18a shows a flow chart for the "morph topo" phase 934. For each node in the topology 550, the topology converter 340 determines 552 whether the node is a connector. If the node is a connector, then for each connected interface (conniface) of the connector (conn1) 554, the topology converter 340 determines 556 whether the conniface is connected to a star segment. If it is connected to a star segment, then for every other interface in the segment 558, the topology converter 340 determines 560 whether there is an existing shs tuple, referred to as the "topo tuple" for the segment. If there is no such tuple, then the topology converter 340 creates 562 a topo shs tuple. The tuco for the interface's host-to-topo shs is then added 564 to the topo shs tuple.

If the connector node is not connected to a star segment 556 and is connected to a bus segment 566, the topology converter 340 determines 568 whether there is an existing mhs tuple for conn1. If there is not an existing mhs tuple for conn1, then a topo mhs tuple is created 570. A tuco is added 572 for the host to the mhs tuple.

If the connector node is not connected to either a star segment 556 or to a bus segment 566, then the topology converter knows that it is connected to another connector (conn2). If such a connector does not already have an existing connLinks tuple for conn1 and conn2 576, then a connLinks tuple is created 578. After processing the bus segment, star segment, and conn-to-conn segment, for each conniface 554, the topology converter 340 proceeds to the next node 550.

Figure 18B:
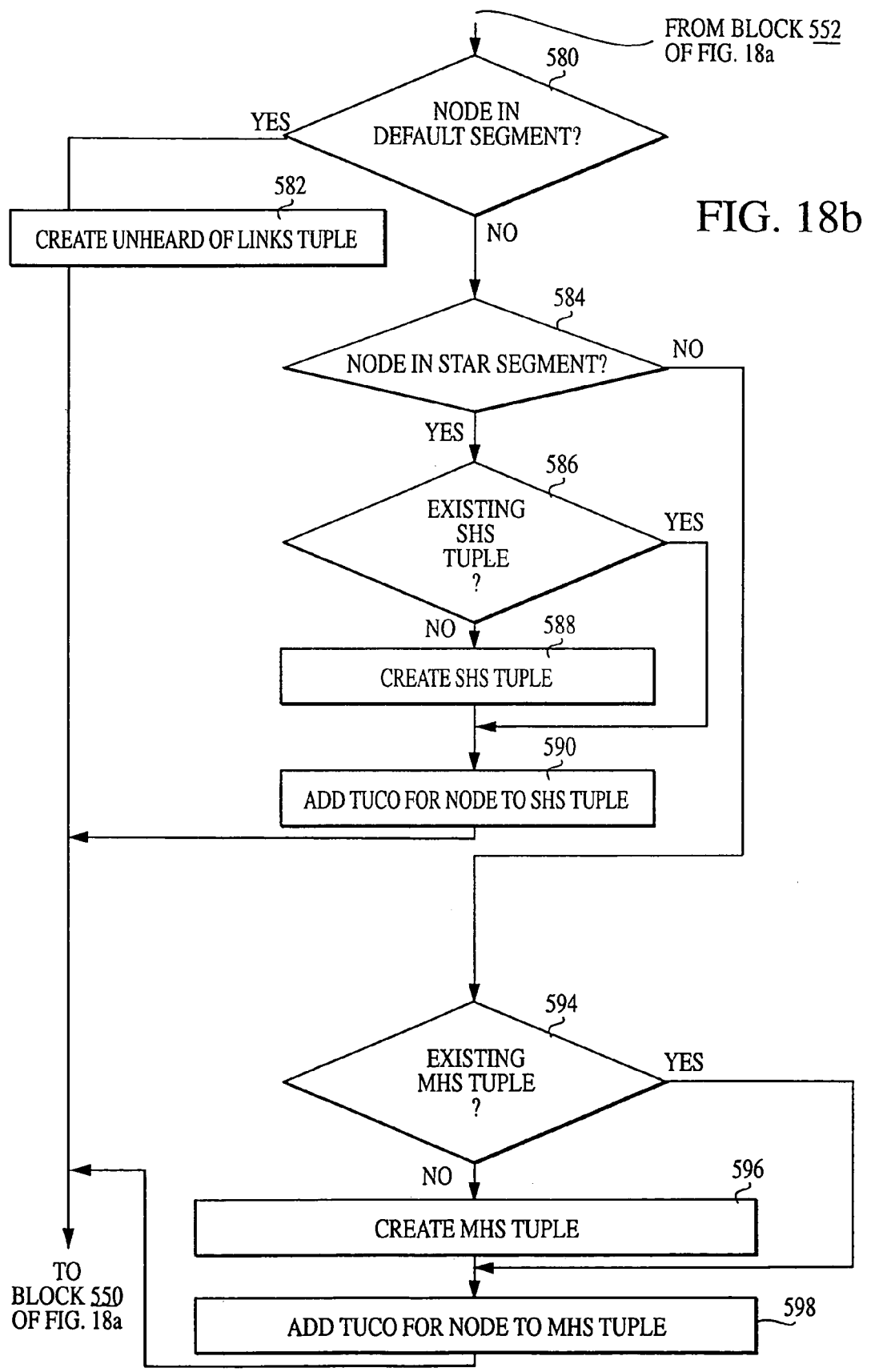

FIG. 18b shows a continuation of the flow chart of FIG. 18a showing the steps of the method when the topology converter 340 determines that the node is not a connector 552. If the node is in the default segment, then an "unheardOfLinks" tuple is created 582 and the topology converter proceeds to the next node 550. If the node is not in the default segment 580, then the topology converter 340 determines whether the node is in a star segment 584. If the node is in a star segment, then if there is not already an shs tuple, the topology converter 340 creates 588 an shs tuple. The tuco for the node is then added 590 to the shs tuple, and the topology converter 340 proceeds to the next node 550.

If the node is not in a star segment, then the topology converter 340 knows that it is in the bus segment. If there is not already an mhs tuple for the node, 594, then the topology converter 340 creates 596 an mhs tuple. The tuco for the node is then added 598 to the mhs tuple, and the topology converter proceeds to the next node 550.

Figure 19:
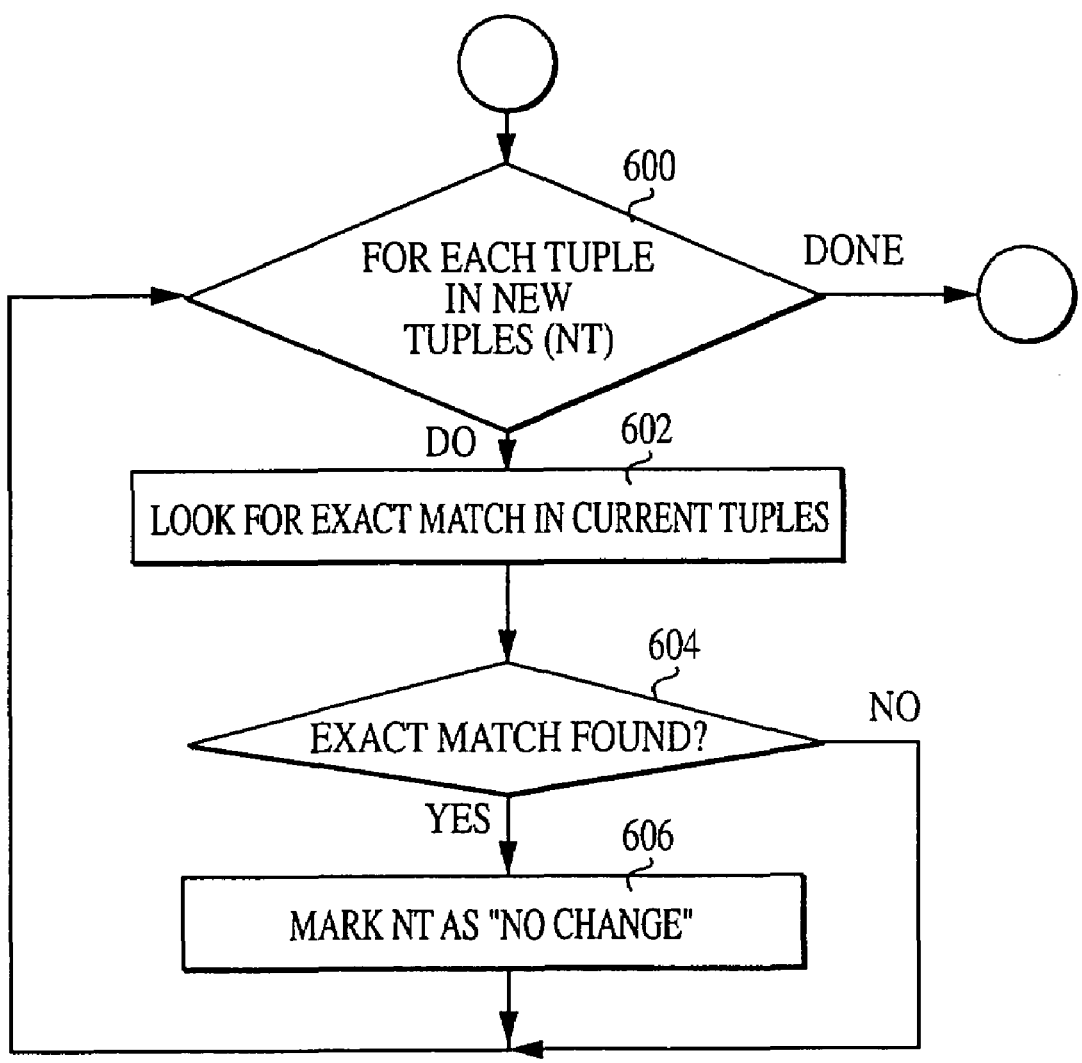
FIG. 19 is a flow chart of the duplication discard phase of the method used by the topology converter.

FIG. 19 shows a flow chart for the discard duplicates phase 936 of the topology converter 340. For each tuple in the new tuples (nt) 600, the topology converter looks for 602 an exact match in the current tuples stored in the topodb. If an exact match is found 604, then the new tuple is marked 606 as "no change" indicating that this is an identical tuple.

FIGS. 20a–d show a flow chart for the identify different tuples phase 938. The system looks through each tuple in the new SinglyHeardSegments (newSHS) tuple list 608 and tries to identify and fix 610 swapped ports on connectors. Swapped ports are identified by considering those segment tuples in both the new topology and the existing topology that differ only by the port specification in the tuco. Each tuple that is fixed as a swapped port is marked 612 as "handled." The system also looks through each tuple in the new multiHeardSegments tuple list (newMHS) 614 and tries to identify and fix 616 swapped ports on connectors. Each tuple that is fixed as a swapped port is marked 618 as "handled."

The system then processes 620 each unmarked tuple in the newSHL tuples. Four cases are possible for the host of the newSHL tuples. The host of the newSHL can be found in the current singlyHeardLinks (curSHL) 622, the current multiHeardLinks (curMHL) 630, the current connlinks (curCL) 638, or the current UnheardOfLinks (curUOL) 642. If the host of a newSHL tuple is found 622 in the current SinglyHeardLinks (curSHL) tuples, then the system determines 624 if there is a matching connector tuco between the newSHL tuples and the curSHL tuples. If there is a matching tuco, then the system changes 626 the host connection attribute. If there is not a matching tuco, then the host connection is moved 628 in the topology.

If the host is found in the curMHL tuples 630, then the system determines 632 whether there is a matching connector tuco between the newSHL tuples and the curSHL tuples. If there is a matching connector, then the segment type of connection is changed 634. If there is not a matching connector, then the host connection is moved 636 in the topology. If the host is found in the curCL tuples 638, then the host is moved 640 into a star segment of the connector. If it is found in the curUOL 642, then the host is moved 644 into the star segment of the connector.

Figure 20A:
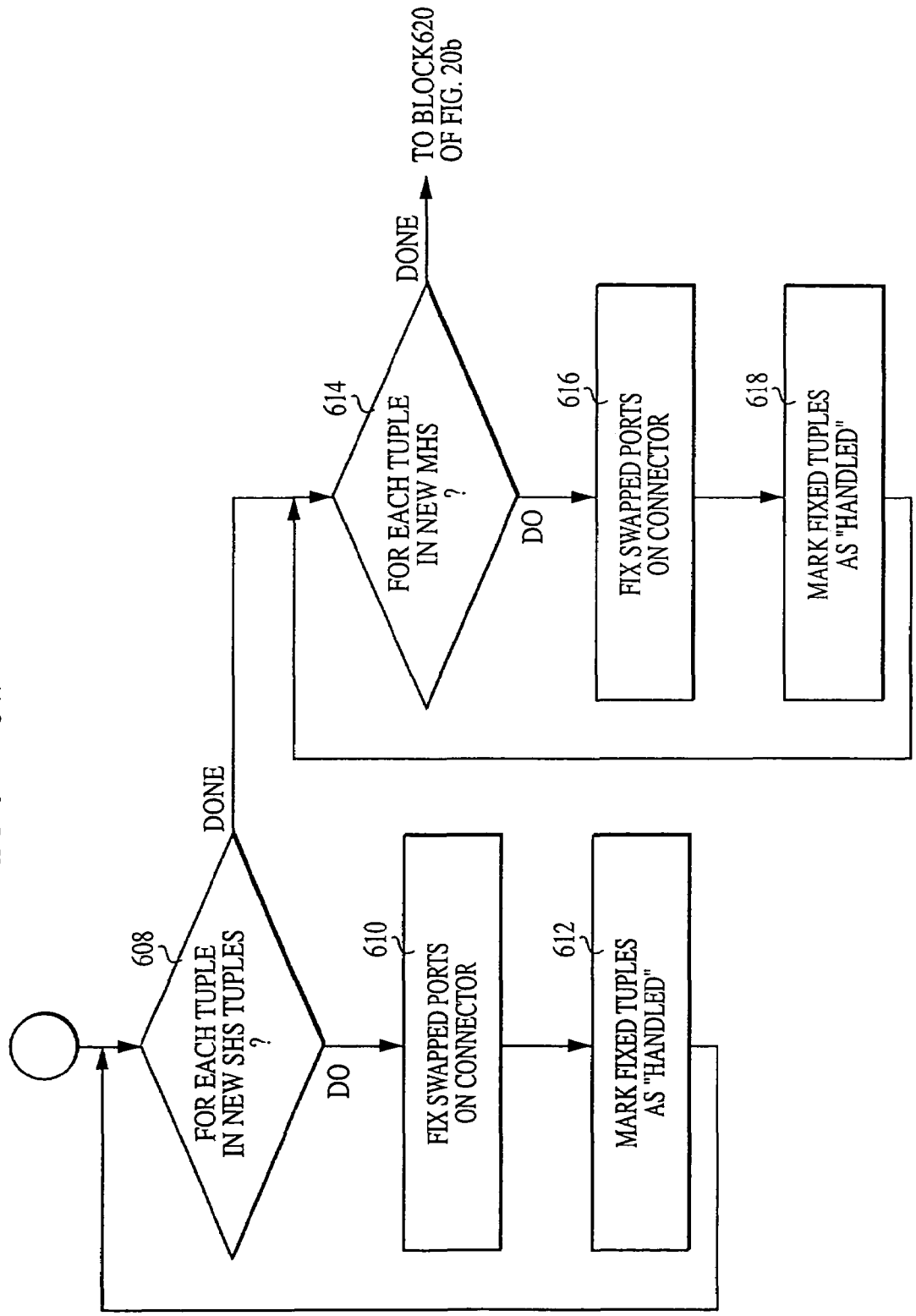
FIGS. 20a–d are flow charts of the identify different tuples phase of the method used by the topology converter.
Figure 20B:
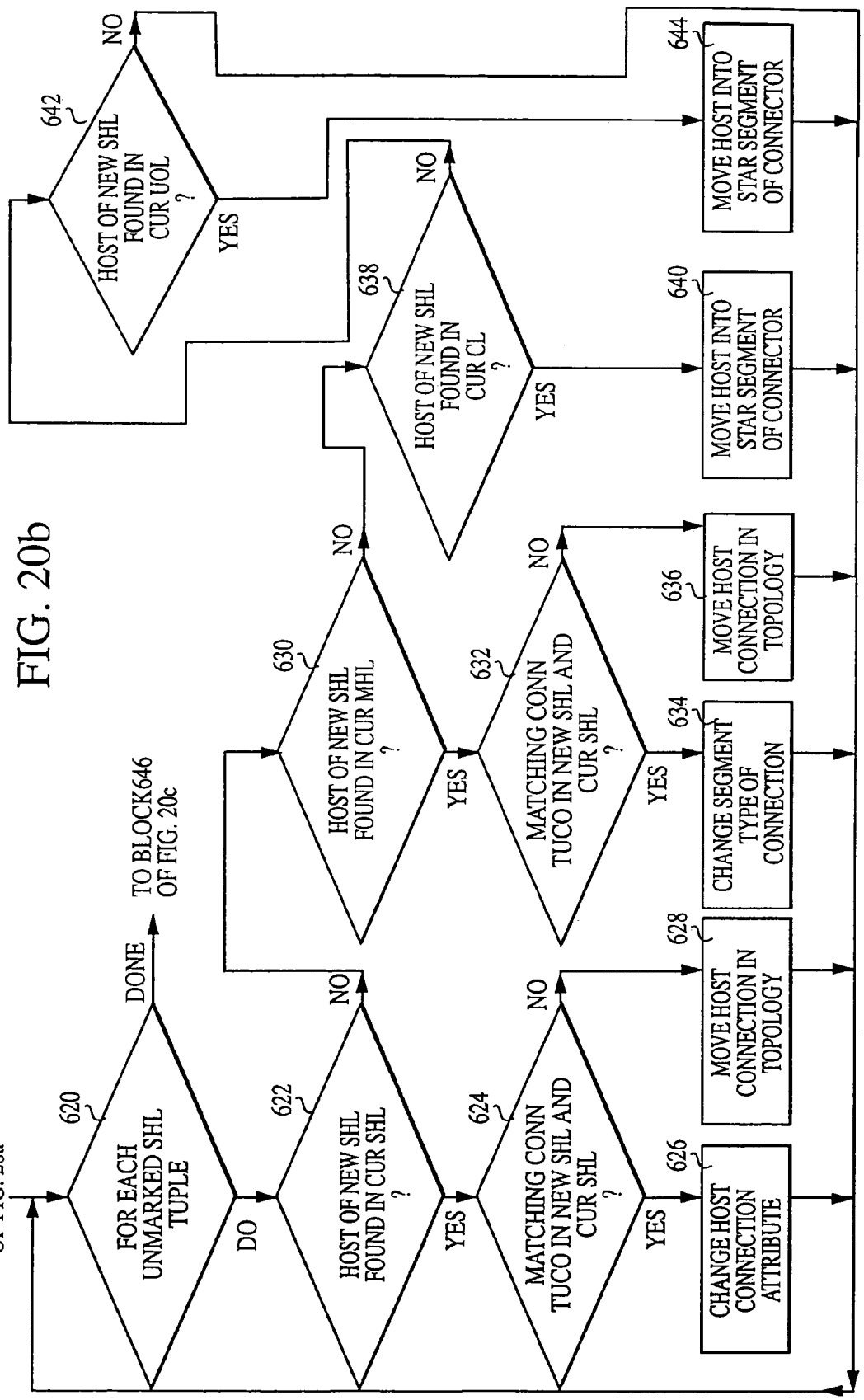
Figure 20C:
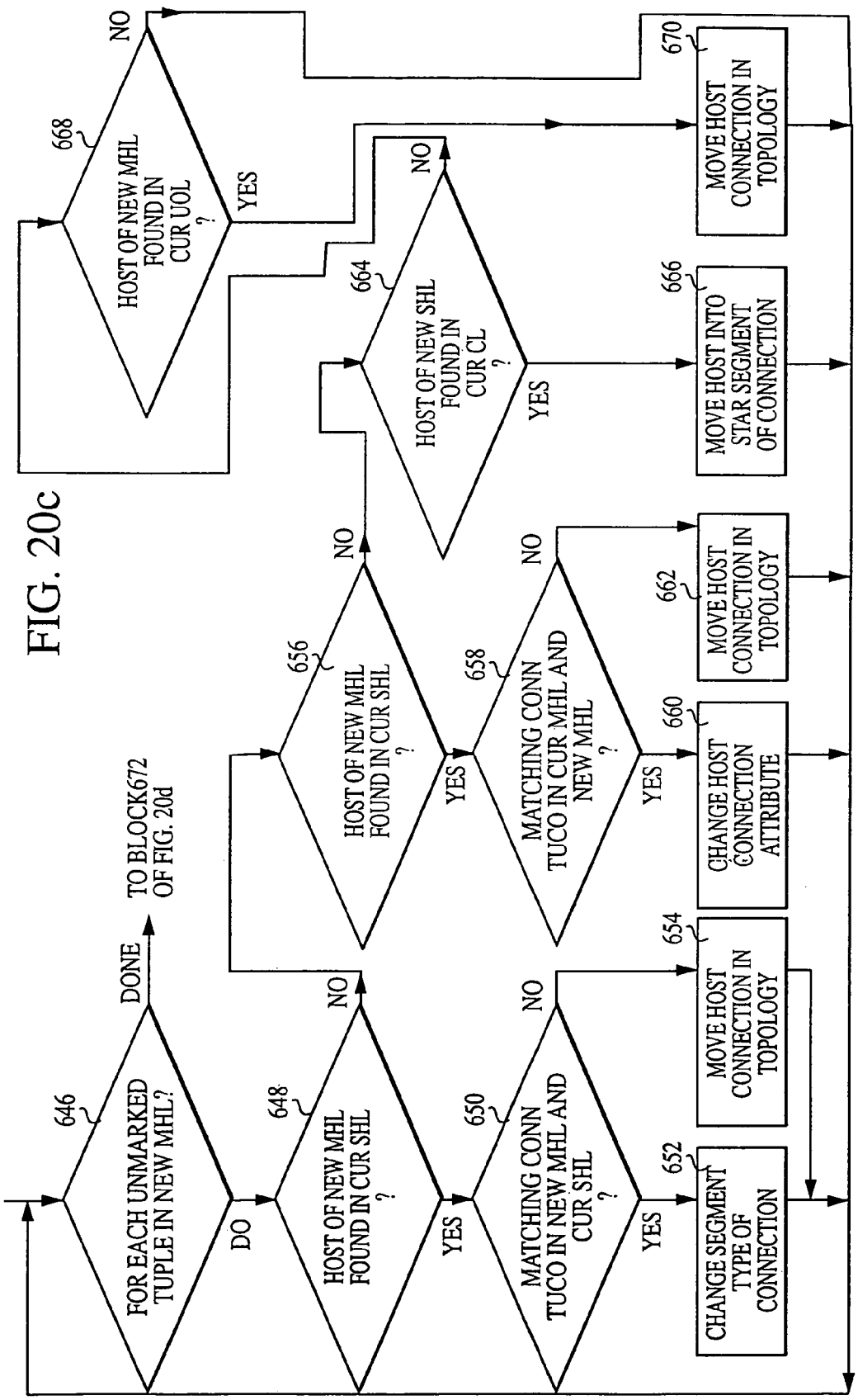

FIG. 20c shows another stage of the processing undertaken during the identify different tuples phase 938. For each unmarked tuple in the new multiHeardLinks tuples (newMHL) 946, four cases are possible for the host of the newMHL. The host of the newMHL may be found in the curSHL 648, the curMHL 656, the curCL 664, or the curUOL 668. If the host is found in the curSHL 648, then the system determines 650 whether there is a matching connector tuco between the newMHL and the curMHL. If there is a matching tuco, then the segment type of connection is changed 652. If there is not a matching tuco, then the host connection is moved 654 in the topology.

If the host is found in the curMHL tuples 656, then the system determines 658 whether there is a matching connector tuco in both the curMHL tuples and the newMHL tuples. If there is a matching connector tuco, then the host connection attribute is changed 660. If there is not a matching tuco, then the host connection is moved 662 in the topology. If the host is found in the curCL tuples 664, then the host is moved into a bus segment of a connector. If the host is found in the curUOL tuples 668, then the host connection is moved 670 in the topology.

Figure 20D:
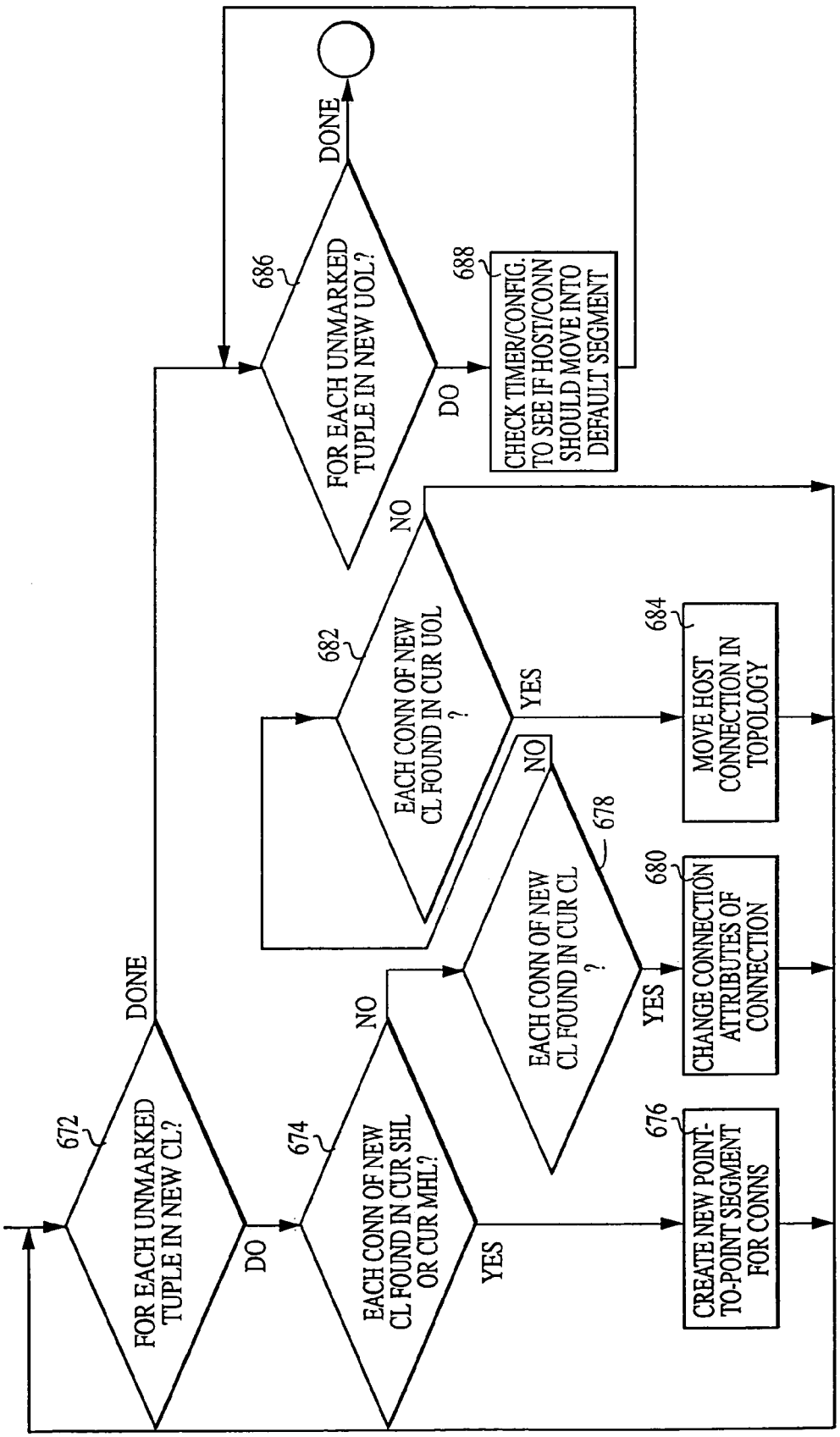

FIG. 20d shows another portion of the identify different tuples phase 938. For each unmarked tuple in the newCL tuples 672, there are three possibilities for the connector. The connector of the unmarked tuple in newCL can be found in the curSHL or curMHL 674, in the curCL 678, or in the curUOL 682. If each connector is found in the curSHL or curMHL list 674, then the system creates 676 a new point-to-point segment for the connectors. If the connectors are found in the curCL 678, then the connection attributes of the connectors are changed 680. If each connector is found in the curUOL tuples 682, then the host connection is moved 684 in the topology.

Another part of the identify different tuples phase 938 is shown in blocks 686 and 688 of FIG. 20d. For each unmarked tuple in the newUOL tuples 686, the system checks 688 the timer/configuration to determine whether the host/conn should move into the default segment from its current segment.

An advantage of the system is that it may be schedulable. The system may map network topology continuously, as done by existing systems, or it may be scheduled to run only at certain intervals, as desired by the user. A further advantage of the system is that it is capable of processing multiple connections between the same devices and of processing connection meshes, because it tracks each nodal connection independently, without limitations on the types of connections that are permitted to exist.

Although the present invention has been described with respect to particular embodiments thereof, variations are possible. The present invention may be embodied in specific forms without departing from the essential spirit or attributes thereof. It is desired that the embodiments described herein be considered in all respects illustrative and not restrictive and that reference be made to the appended claims for determining the scope of the invention.

What is claimed is:

1. In a network having interconnected nodes with data tuples that represent nodal connections, a method for mapping a network topology by identifying changes between an existing topology and a new topology, the method comprising:
   creating a list of existing tuples from an existing topology representing nodal connections of a network at a prior time;
   creating a new list of a plurality of tuples for a topology of the network at a current time, wherein the new list of tuples represent nodal connections of the network at the current time, and wherein each of the tuples comprises a host identifier, interface information, and a port specification;
   receiving new tuples list that represent new nodal connections; and
   comparing the list of existing tuples with the new tuples list to identify changes to the topology.

2. The method of claim 1, further comprising updating a topology database with a new topology corresponding to the list of existing tuples modified by the changes to the topology.

3. The method of claim 1, further comprising taking action on the changes to the topology.

4. The method of claim 1, wherein the step of creating a new list of tuples comprises identifying duplicate tuples that appear both in the list of existing tuples and in the new tuples, and maintaining a current status of the topology for these tuples.

5. The method of claim 1, wherein the step of creating a new list of tuples comprises identifying a swapped port condition on a connector.

6. The method of claim 1, wherein the step of creating a new list of tuples comprises searching for a host of a new singly-heard host link tuple or a new multi-heard host link tuple in the list of existing tuples.

7. A system for mapping a network topology by identifying changes between an existing topology and a new topology, based on changes to data tuples that represent nodal connections comprising:
   a topology database that stores an existing topology of a network using tuples, wherein each tuple includes a host identifier, interface information, and a port specification for a node in the network from the existing topology representing nodal connections of the network at a prior time; and
   a topology converter connected to the topology database the receives new tuples that represent new nodal connections for a topology of the network at a current time, compares the new tuples with the existing tuples to identify changes in the network by comparing the host identifiers, the interface information, and the port specifications, and determines differences between the new tuples with the existing tuples representing nodal connections of the network at the prior time,
   wherein the topology converter creates the new tuples for the topology of the network.

8. The system of claim 7, wherein the topology converter updates the topology database with a new topology based on the new tuples.

9. The system of claim 7, wherein the topology converter attempts to identify swapped ports on connectors.

10. The system of claim 7, wherein the topology converter identifies duplicate tuples that appear both in the list of existing tuples and in the new tuples, and maintains a current status of the topology for these tuples.

11. The system of claim 7, wherein the topology converter searches for a host of a new singly-heard host link tuple or a new multi-heard host link tuple in the list of existing tuples.

12. The system of claim 7, wherein the topology converter searches for a connector of a new conflict links tuple in the list of existing tuples.

13. A computer-readable medium having computer-executable instructions for performing a method for mapping a network topology by identifying changes between an existing topology and a new topology in a network having a interconnected nodes, the method comprising:
   creating a list of existing tuples from an existing topology representing nodal connections of a network at a prior time;
   creating a new list of a plurality of tuples for a topology of the network at a current time, wherein the new list of tuples represent nodal connections of the network at the current time and wherein each of the tuples comprises a host identifier, interface information, and a port specification;
   receiving new tuples list that represent new nodal connections;

comparing the list of existing tuples with the new tuples list to identify changes to the topology; and
updating a topology database with a new topology based on the comparing.

14. The medium of claim 13, wherein a topology converter receives the new tuples list from a connection calculator that calculates connections between nodes.

15. The medium of claim 13, wherein the step of creating the new tuples list comprises identifying duplicate tuples that appear both in the list of existing tuples and in the new tuples list, and maintaining a current status of the topology for these duplicate tuples.

16. The medium of claim 13, wherein the step of creating the new tuples list comprises identifying a swapped port condition on a connector.

17. The medium of claim 13, wherein the step of creating the new tuples list comprises searching for a host of a new singly-heard host link tuple or a new multi-heard link tuple in the list of existing tuples.

18. The medium of claim 13, wherein the steps of creating the new tuples list comprises searching for a connector of a new conflict links tuple in the list of existing tuples.

* * * * *